US012527244B2

(12) United States Patent
Nishii et al.

(10) Patent No.: US 12,527,244 B2
(45) Date of Patent: Jan. 20, 2026

(54) WORKING VEHICLE AND WORKING VEHICLE CONTROL METHOD

(71) Applicant: Yanmar Holdings Co., Ltd., Osaka (JP)

(72) Inventors: Yasuto Nishii, Osaka (JP); Yuji Yamaguchi, Osaka (JP); Hidetaka Suzuki, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 258 days.

(21) Appl. No.: 18/039,711

(22) PCT Filed: Oct. 27, 2021

(86) PCT No.: PCT/JP2021/039597
§ 371 (c)(1),
(2) Date: May 31, 2023

(87) PCT Pub. No.: WO2022/118567
PCT Pub. Date: Jun. 9, 2022

(65) Prior Publication Data
US 2025/0072310 A1    Mar. 6, 2025

(30) Foreign Application Priority Data

Dec. 2, 2020  (JP) ................................ 2020-200120

(51) Int. Cl.
*A01B 69/04* (2006.01)
*A01D 41/127* (2006.01)
(52) U.S. Cl.
CPC ........ *A01B 69/008* (2013.01); *A01D 41/1278* (2013.01)

(58) Field of Classification Search
None
See application file for complete search history.

(56) References Cited

FOREIGN PATENT DOCUMENTS

| CN | 111448120 A | * | 7/2020 | ........... A01B 69/007 |
| EP | 1338186 A2 | * | 8/2003 | ........... A01B 69/004 |

(Continued)

OTHER PUBLICATIONS

International Search Report dated Dec. 21, 2021 issued in corresponding PCT Application PCT/JP2021/039597.

*Primary Examiner* — Hitesh Patel
*Assistant Examiner* — Elle Rose Knudson
(74) *Attorney, Agent, or Firm* — NORTON ROSE FULBRIGHT US LLP

(57) ABSTRACT

A combine includes an operation unit; a display unit; a reference traveling line unit that acquires a reference traveling line indicating a direction of traveling; a location information unit that acquires location information indicating a location of a host vehicle; a field information unit that acquires field information indicating a location of an outer edge of an unworked land in a field; a display control unit that displays, on the display unit, the outer edge of the unworked land and a setting traveling line which is parallel to the reference traveling line and in which the location of the host vehicle indicated by the latest location information is set as a reference point; and a traveling control unit that makes the host vehicle travel along the setting traveling line based on the operation unit receiving an operation of switching from manual steering to the automatic steering.

14 Claims, 19 Drawing Sheets

(56) References Cited

FOREIGN PATENT DOCUMENTS

| | | | | |
|---|---|---|---|---|
| JP | 2009208742 A | * | 9/2009 | ........... B62D 15/028 |
| JP | 2017-123803 A | | 7/2017 | |
| JP | 2018147421 A | * | 9/2018 | |
| JP | 2019-136039 A | | 8/2019 | |
| JP | 2019-141103 A | | 8/2019 | |
| JP | 2019198244 A | * | 11/2019 | ............. G01S 19/47 |
| JP | 2020-137483 A | | 9/2020 | |
| WO | WO-2017195510 A1 | * | 11/2017 | ............... G05D 1/02 |

* cited by examiner

REFERENCE TRAVELING LINE SET. PLEASE MOVE TO START LOCATION OF AUTOMATIC REAPING.

BACK

PLEASE MOVE TO START LOCATION OF AUTOMATIC REAPING.

BACK

WORKING VEHICLE AND WORKING VEHICLE CONTROL METHOD

CROSS-REFERENCE TO RELATED APPLICATIONS

This application is a national stage application pursuant to 35 U.S.C. § 371 of International Application No. PCT/JP2021/039597, filed on Oct. 27, 2021, which claims priority under 35 U.S.C. § 119 to Japanese Patent Application No. 2020-200120 filed on Dec. 2, 2020, the disclosures of which are hereby incorporated by reference in their entireties.

TECHNICAL FIELD

The present invention relates to a working vehicle that performs work in a field, and a working vehicle control method.

BACKGROUND ART

Conventionally, techniques for improving the working efficiency of combines have been studied. For example, in Patent Literature 1, proposed is an agricultural machine including: a traveling body that can freely switch between manual travel performed by manual steering, and automatic travel in which travel is performed by automatic steering along a setting traveling line which is set to be parallel to a reference traveling line; a changeover switch that can be freely switched between manual travel and automatic travel; and a start point setting unit that sets a plane location of the traveling body at a time point at which a switch from manual travel to automatic travel is made by the changeover switch as a start point of the setting traveling line.

CITATION LIST

Patent Literature

Patent Literature 1: Japanese Unexamined Patent Application Publication No. 2017-123803

DISCLOSURE OF INVENTION

Problems to be Solved by the Invention

However, with the configuration proposed in Patent Literature 1, it is not known at which location the setting traveling line will be set until automatic steering is started. As a result, it may be found after the start of automatic steering that the location of the setting traveling line is offset, and the setting of the setting traveling line may need to be repeated.

The present invention has been made in view of the above circumstances, and an object of the present invention is to provide a working vehicle and a working vehicle control method in which a setting traveling line that is parallel to a reference traveling line can be easily set.

Means for Solving the Problems

In order to solve the above problems, a working vehicle according to the present invention includes: an operation unit that receives an operation; a display unit that displays an image; a reference traveling line acquisition unit that acquires a reference traveling line indicating a direction of travel by automatic steering; a location information acquisition unit that acquires location information indicating a location of a host vehicle; a field information acquisition unit that acquires field information indicating a location of an outer edge of unworked land in a field; a display control unit that displays, on the display unit, the outer edge of the unworked land indicated by the field information, and a setting traveling line which is parallel to the reference traveling line and in which the location of the host vehicle indicated by the latest location information is set as a reference point; and a traveling control unit that causes a host vehicle to travel by automatic steering along the setting traveling line at a time point at which the operation unit receives an operation that switches from manual steering to automatic steering.

The display control unit may display the setting traveling line differently depending on whether a condition required to start automatic steering is met or the condition is not met.

The display control unit may display an outer edge of a work area of a host vehicle based on the setting traveling line.

The display control unit may, in a case where the work area is offset from the outer edge of the unworked land indicated by the field information after a condition required to start automatic steering is met, display information indicating an offset in the work area.

The traveling control unit may, in a case where the operation unit receives an operation allowing travel by automatic steering after the display control unit displays information indicating the offset in the work area, cause a host vehicle to travel by automatic steering along the setting traveling line.

The display control unit may display a recommended traveling line obtained from the outer edge of the unworked land and a work area of a host vehicle, and in a case where the setting traveling line is superimposed on the recommended traveling line, display that a host vehicle has reached the recommended traveling line.

The working vehicle may include a correction unit that, in a case where a location of a host vehicle is changed during travel by automatic steering in a direction that intersects the setting traveling line, corrects a direction of the setting traveling line to become parallel to a straight line connecting a start point and an end point of travel by automatic steering.

Furthermore, a working vehicle control method according to the present invention includes: an information acquisition step for acquiring a reference traveling line indicating a direction of travel by automatic steering, a location information indicating a location of a host vehicle, and field information indicating a location of an outer edge of unworked land in a field; a display control step for displaying, on a display unit, the outer edge of the unworked land indicated by the field information, and a setting traveling line which is parallel to the reference traveling line and in which the location of the host vehicle indicated by the latest location information is set as a reference point; and a traveling control step for causing a host vehicle to travel by automatic steering along the setting traveling line at a time point at which an operation unit receives an operation that switches from manual steering to automatic steering.

In the display control step, the setting traveling line may be displayed differently depending on whether a condition required to start automatic steering is met or the condition is not met.

In the display control step, an outer edge of a work area of a host vehicle may be displayed based on the setting traveling line.

In the display control step, in a case where the outer edge of the work area is offset from the outer edge of the unworked land indicated by the field information after a condition required to start automatic steering is met, information may be displayed indicating an offset in the work area.

In the display control step, in a case where the operation unit receives an operation allowing travel by automatic steering after information indicating the offset in the work area is displayed in the display control step, a host vehicle may be made to travel by automatic steering along the setting traveling line in the traveling control step.

In the display control step, a recommended traveling line may be displayed which is obtained from the outer edge of the unworked land and a work area of a host vehicle, and in a case where the setting traveling line is superimposed on the recommended traveling line, it may be displayed that a host vehicle has reached the recommended traveling line.

The working vehicle control method may include a correction step for correcting, in a case where a location of a host vehicle is changed during travel by automatic steering in a direction that intersects the setting traveling line, a direction of the reference traveling line to become parallel to a straight line connecting a start point and an end point of travel by automatic steering.

Effect of the Invention

According to the present invention, a setting traveling line that is parallel to a reference traveling line can be easily set.

DESCRIPTION OF EMBODIMENTS

Hereinafter, a combine 1 (an example of a working vehicle) according to an embodiment of the present invention will be described with reference to the drawings.

Figure 1:
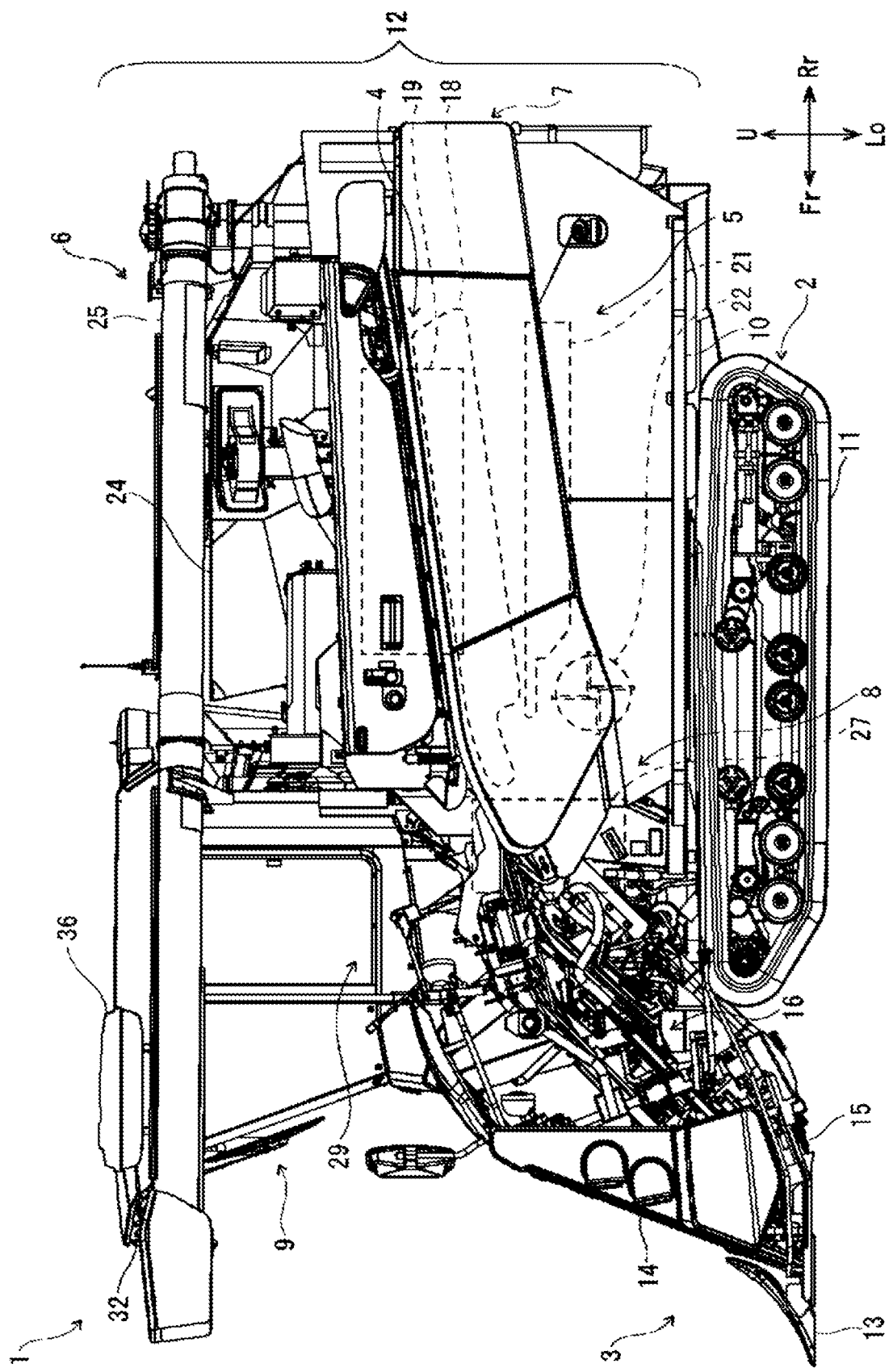
FIG. 1 is a left side view of a combine according to an embodiment of the present invention.
Figure 2:
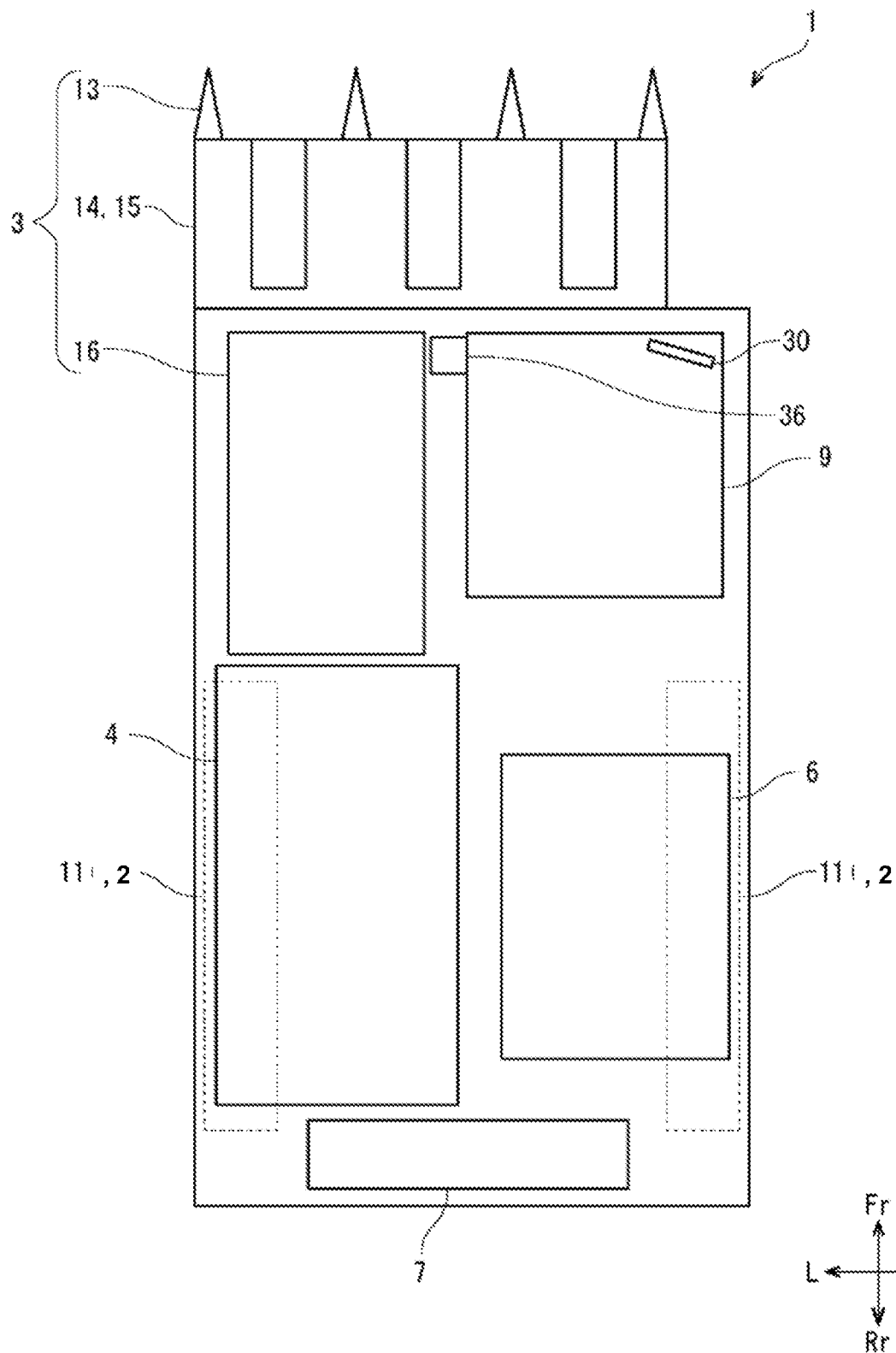
FIG. 2 is a plan view showing schematically the configuration of a combine according to an embodiment of the present invention.
Figure 3:
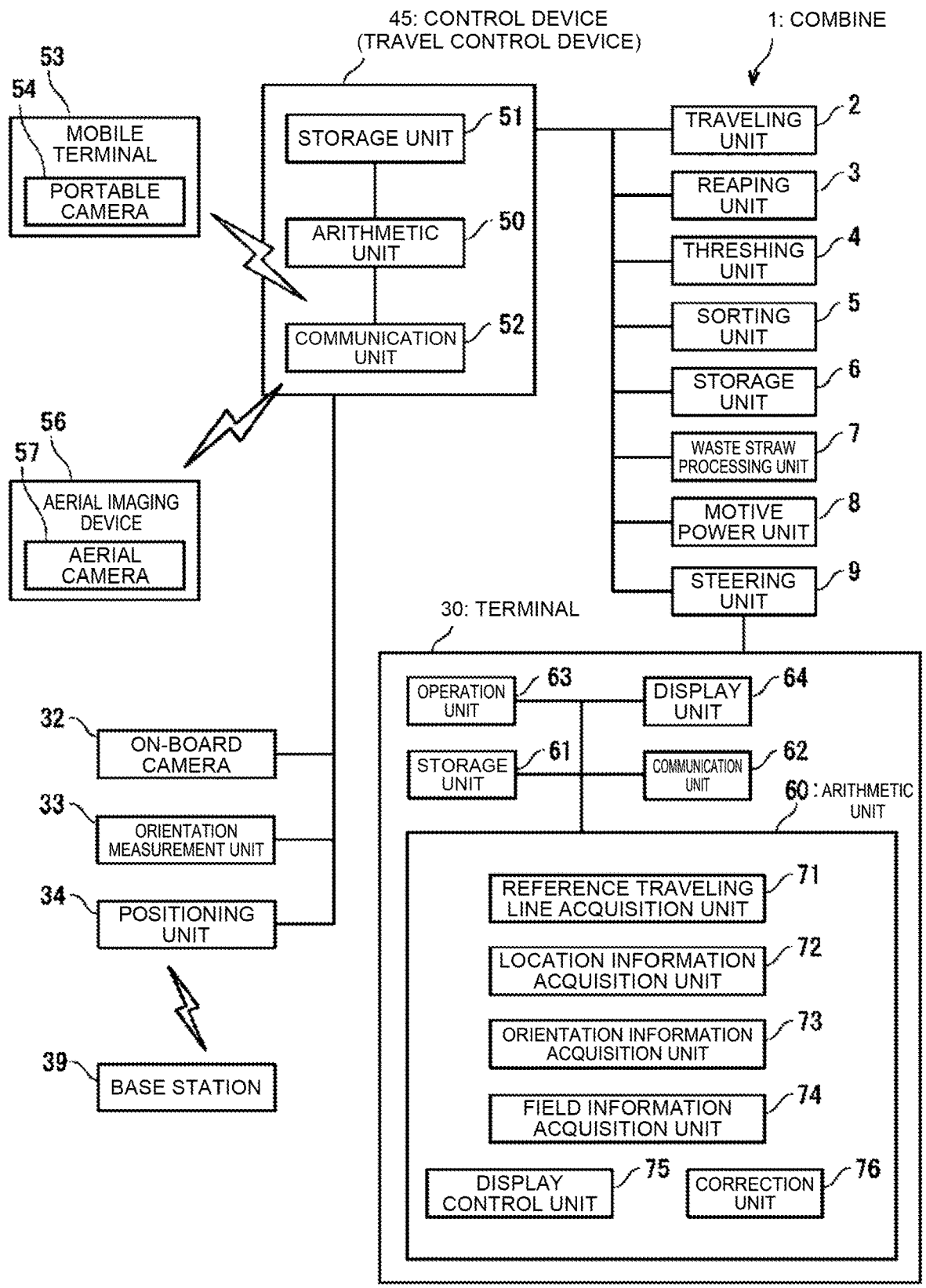
FIG. 3 is a block diagram showing the electrical configuration of a combine according to an embodiment of the present invention.
Figure 4:
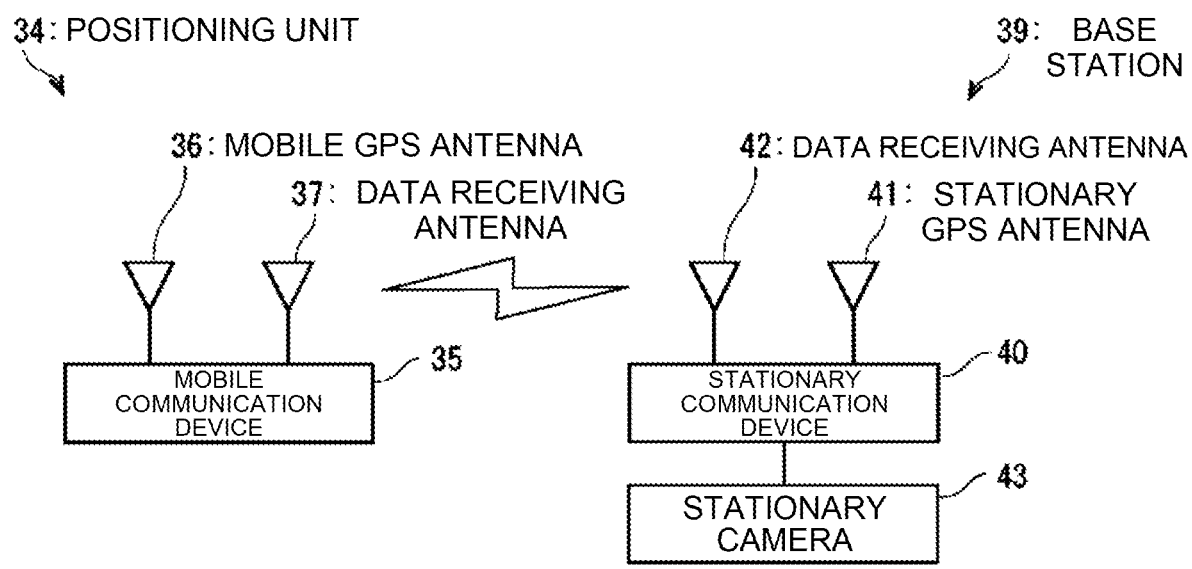
FIG. 4 is a block diagram showing a positioning unit and a base station according to an embodiment of the present invention.

First, an overview of the combine 1 will be described. FIG. 1 is a left side view of the combine 1. FIG. 2 is a plan view schematically showing the configuration of the combine 1. FIG. 3 is a block diagram showing the electrical configuration of the combine 1. FIG. 4 is a block diagram showing a positioning unit 34 and a base station 39. In each of the drawings, U, Lo, L, R, Fr, and Rr represent up, down, left, right, front, and rear, respectively.

Overview of Combine

The combine 1 includes an automatic reaping work function that performs reaping work with respect to grain culms while traveling by automatic steering. In the case of automatic steering, the speed control can be automatic or manual. Furthermore, the steering and speed of the combine 1 can be manually controlled.

As shown in FIG. 1, the combine 1 includes a traveling unit 2, a reaping unit 3, a threshing unit 4, a sorting unit 5, a storage unit 6, a waste straw processing unit 7, a motive power unit 8, and a steering unit 9. The combine 1 is a so-called self-threshing combine, in which grain culms (reaping target) harvested by the reaping unit 3 are threshed by the threshing unit 4 while traveling due to the traveling unit 2, and then the grains are sorted by the sorting unit 5 and stored in the storage unit 6. Furthermore, in the combine 1, the waste straw after threshing is processed by the waste straw processing unit 7. The combine 1 drives the traveling unit 2, the reaping unit 3, the threshing unit 4, the sorting unit 5, the storage unit 6, and the waste straw processing unit 7 by the motive power supplied from the motive power unit 8. In addition, the present invention may be applied to an ordinary combine.

The traveling unit 2 is provided below a body frame 10. The reaping unit 3 is provided in front of the body frame 10. The threshing unit 4, the sorting unit 5, the storage unit 6, the waste straw processing unit 7, the motive power unit 8, and the steering unit 9 are provided above the body frame 10. The reaping unit 3, the threshing unit 4, the sorting unit 5, the storage unit 6, the waste straw processing unit 7, the motive power unit 8, and the steering unit 9 are provided on the body frame 10. A main body portion 12 includes the body frame 10, the reaping unit 3, threshing unit 4, the sorting unit 5, the storage unit 6, the waste straw processing unit 7, the motive power unit 8, and the steering unit 9, and are supported by the traveling unit 2. That is, the combine 1 is configured so that the traveling unit 2 travels while supporting the main body portion 12.

The traveling unit 2 includes a pair of left and right crawler-type traveling devices 11 provided below the body frame 10. The crawler-type traveling devices 11 are connected to an engine 27 via a transmission (not illustrated), and are rotated by the motive force generated by the engine 27. The rotational drive of the left and right crawler-type traveling devices 11 is independently controlled, which enables forward, backward, and turning movements.

The reaping unit 3 is provided in front of the traveling unit 2. The reaping unit 3 is provided so as to be capable of being raised and lowered between a lowered position, which enables reaping of the grain culms on a field H, and a raised position, in which reaping of the grain culms is disabled. The reaping unit 3 includes a divider 13, a raising device 14, a cutting device 15, and a conveying device 16. The divider 13 guides the grain culm on the field H to the raising device 14. The raising device 14 raises the grain culms guided by the divider 13. The cutting device 15 cuts the grain culms raised by the raising device 14. The conveying device 16 is provided above the rear side of the cutting device 15 and on the left side of the main body portion 12, and conveys the grain culms that have been cut by the cutting device 15 toward the rear.

The threshing unit 4 is provided behind the reaping unit 3 and on the left side of the main body portion 12. The threshing unit 4 includes a feed chain 18 and a threshing cylinder 19. The feed chain 18 conveys the grain culms that have been conveyed from the conveying device 16 of the reaping unit 3 for threshing, and further conveys the grain culms after threshing, that is, the waste straw, to the waste straw processing unit 7. The threshing cylinder 19 threshes the grain culms conveyed by the feed chain 18.

The sorting unit 5 is provided below the threshing unit 4. The sorting unit 5 includes a swing sorting device 21, an air sorting device 22, a grain conveying device (not illustrated), and a straw waste discharging device (not illustrated). The swing sorting device 21 sifts the threshed grains that have dropped down from the threshing unit 4 to perform sorting into grains, straw waste, and the like. The air sorting device 22 further sorts the threshed grains sorted by the swing sorting device 21 into grains, straw waste, and the like by blowing air. The grain conveying device conveys the grains sorted by the swing sorting device 21 and the air sorting device 22 to the storage unit 6. The straw waste discharging device discharges the straw waste and the like sorted by the swing sorting device 21 and the air sorting device 22 to the outside of the machine.

The storage unit 6 is provided on the right of the threshing unit 4. The storage unit 6 includes a grain tank 24 and a discharging device 25. The grain tank 24 stores the grains conveyed from the sorting unit 5. The discharging device 25 is composed of an auger and the like, and discharges the grains stored in the grain tank 24 to an arbitrary location.

The waste straw processing unit 7 is provided behind the threshing unit 4. The waste straw processing unit 7 includes a waste straw conveying device (not illustrated) and a waste straw cutting device (not illustrated). The waste straw conveying device conveys the waste straw conveyed from the feed chain 18 of the threshing unit 4 to the waste straw cutting device. The waste straw cutting device cuts the waste straw conveyed by the waste straw conveying device, and discharges it to the outside of the machine.

The motive power unit 8 is provided above the front side of the traveling unit 2. The motive power unit 8 includes the engine 27 for generating rotational motive power. The motive power unit 8 transmits the rotational motive power generated by the engine 27 to the traveling unit 2, the reaping unit 3, the threshing unit 4, the sorting unit 5, the storage unit 6, and the waste straw processing unit 7.

The steering unit 9 is provided above the motive power unit 8. The steering unit 9 includes a driver's seat 29, a terminal 30 (see FIG. 3) including a touch panel, and a plurality of operation tools (not illustrated). The driver's seat 29 is provided, for example, on the right side of the main body portion 12 and includes a chair or the like on which an operator sits. The terminal 30 is provided in a location that can be operated by an operator seated in the driver's seat 29 (for example, on the front right or front left of the operator). The terminal 30 is a display unit 64 that displays the images and the like captured by an on-board camera 32, a stationary camera 43, and an aerial camera 57 described below, and is also an operation unit 63 that receives operations performed with respect to the combine 1. The plurality of control tools are operated by an operator seated in the driver's seat 29, and include a steering wheel that operates the steering of the combine 1, an accelerator that adjusts the rotation speed of the engine 27 (the travel speed of the combine 1), a raising and lowering switch that raises and lowers the reaping unit 3, and the like.

The combine 1 includes an on-board camera 32, a positioning unit 34, and an orientation measurement unit 33 (see FIGS. 2 and 3).

On-Board Camera

The on-board camera 32, for example, is provided on the upper portion of the front side of the steering unit 9, and images the field H.

Positioning Unit

The positioning unit 34 acquires location information indicating the location of the combine 1 using a satellite positioning system such as a GPS (Global Positioning System). The positioning unit 34 (see FIG. 3) includes a mobile communication device 35, a mobile GPS antenna 36, and a data receiving antenna 37. The mobile communication device 35 receives a signal from a GPS satellite via the mobile GPS antenna 36, and the location information of the combine 1 is acquired by calculating the location of the combine 1 (strictly speaking, the location of the mobile GPS antenna 36) using the received signal. The mobile communication device 35 repeatedly acquires location information at predetermined time intervals. The mobile GPS antenna 36 is provided, for example, on the left side of the steering unit 9, and at substantially the center in the left-right direction of the main body portion 12.

Orientation Measurement Unit

The orientation measurement unit 33 is, for example, an angular velocity sensor (gyro sensor), a triaxial acceleration sensor, a geomagnetic sensor, and the like, and acquires orientation information indicating the orientation of the combine 1 by measuring the orientation of the combine 1. The orientation measurement unit 33 repeatedly acquires orientation information at predetermined time intervals.

Base Station

A base station 39 is installed on a ridge or the like around the field H, which is the work target of the combine 1. The base station 39 includes a stationary communication device 40, a stationary GPS antenna 41, a data transmitting antenna 42, and a stationary camera 43. The stationary communication device 40 communicates with a GPS satellite via the stationary GPS antenna 41 to acquire location information of the base station 39. The stationary communication device 40 transmits correction information based on the location information of the base station 39 to the mobile communication device 35 via the data transmitting antenna 42. The stationary camera 43 images the field H. The stationary communication device 40 acquires the image (field image) captured by the stationary camera 43, and transmits the field image to the mobile communication device 35 via the data transmitting antenna 42. The mobile communication device 35 of the positioning unit 34 receives the correction information and the field information transmitted from the stationary communication device 40 of the base station 39 via the data receiving antenna 37. The mobile communication device 35 corrects the location information of the combine 1 based on the correction information. Note that the base station 39 does not have to be installed, and correction of the location information by the base station 39 does not have to be performed.

Control Device

The control device 45 includes an arithmetic unit 50, a storage unit 51, and a communication unit 52. The various components of the combine 1 described above are connected to the control device 45 via a communication interface. The control device 45 controls the various components of the combine 1 according to input operations made by an operator via the steering unit 9.

The storage unit 51 is, for example, a ROM (Read Only Memory), a RAM (Random Access Memory), a hard disk drive, or a flash memory, and stores programs and data for controlling the various components and various functions of the combine 1. The arithmetic unit 50 is, for example, a CPU (Central Processing Unit), and controls the various components and various functions of the combine 1 by executing arithmetic processing using the programs and data stored in the storage unit 51. Note that control device 45, instead of being a processor or the like that executes programs, may be realized by an integrated circuit that does not use a program.

The communication unit 52 wirelessly communicates with a mobile terminal 53 carried by an operator. The mobile terminal 53 is, for example, a tablet including a touch panel, and is provided with a function that remotely controls the combine 1. The mobile terminal 53 includes a portable camera 54 that images the field H. Furthermore, the communication unit 52 performs wireless communication with an aerial imaging device 56 such as a drone. The aerial imaging device 56 includes an aerial camera 57 that images the field H. When an operator inputs an operation instruction for the aerial imaging device 56 into the terminal 30 or the mobile terminal 53, the aerial imaging device 56 operates according to the operation instruction transmitted from the communication unit 52. Note that the aerial imaging device 56 may perform wireless communication with the mobile terminal 53 instead of, or in addition to, the communication unit 52. The mobile terminal 53 and the aerial imaging device 56 may be omitted.

Terminal

The terminal 30 includes an arithmetic unit 60, a storage unit 61, a communication unit 62, an operation unit 63, and a display unit 64.

The storage unit 61 is, for example, a ROM (Read Only Memory), a RAM (Random Access Memory), a hard disk drive, or a flash memory, and stores programs and data for controlling the various components and various functions of the terminal 30. The arithmetic unit 60 is, for example, a CPU (Central Processing Unit), and controls the various components and various functions of the terminal 30 by executing arithmetic processing using the programs and data stored in the storage unit 61.

The communication unit 52 communicates with the control device 45 of the combine 1. The information used for the travel of the combine 1 is supplied to the control device 45 via the communication unit 62. Furthermore, information indicating the state of the combine 1 is acquired from the control device 45 via the communication unit 62.

When an operator inputs an imaging instruction for the on-board camera 32 of the combine 1, the stationary camera 43 of the base station 39, and the aerial camera 57 of the aerial imaging device 56 into to the terminal 30 or the mobile terminal 53 (hereinafter, referred to as the terminal 30 and the like), the control device 45 controls the on-board camera 32, the stationary camera 43, and the aerial camera 57 and images the field H. The control device 45 displays the field images captured by the on-board camera 32, the stationary camera 43, and the aerial camera 57 on the terminal 30 and the like. When an operator inputs a display instruction of the field image captured by the portable camera 54 of the mobile terminal 53 into the terminal 30 and the like, the control device 45 controls the mobile terminal 53 via the communication unit 52 and causes the terminal 30 and the like to display the field image. Note that the field image does not have to be displayed.

Figure 5:
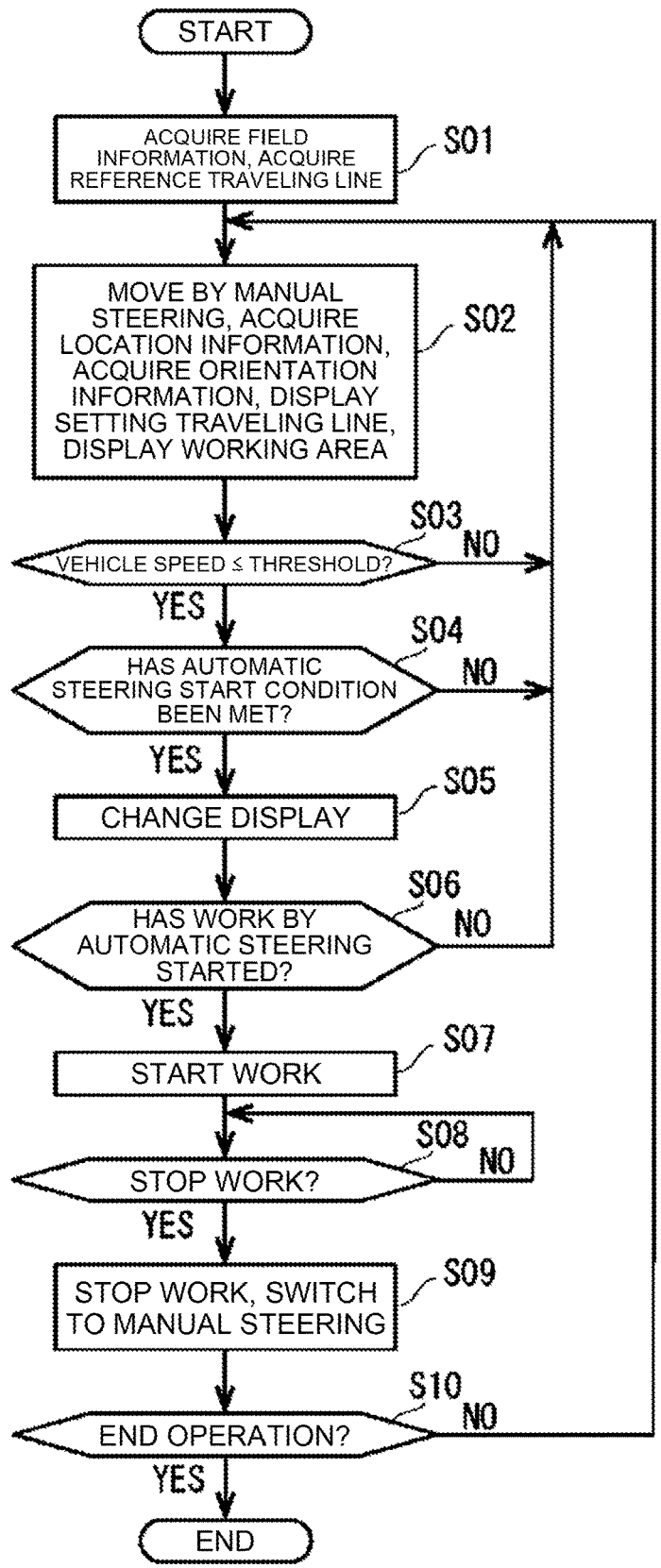
FIG. 5 is a control flow diagram of a combine according to an embodiment of the present invention.
Figure 6:
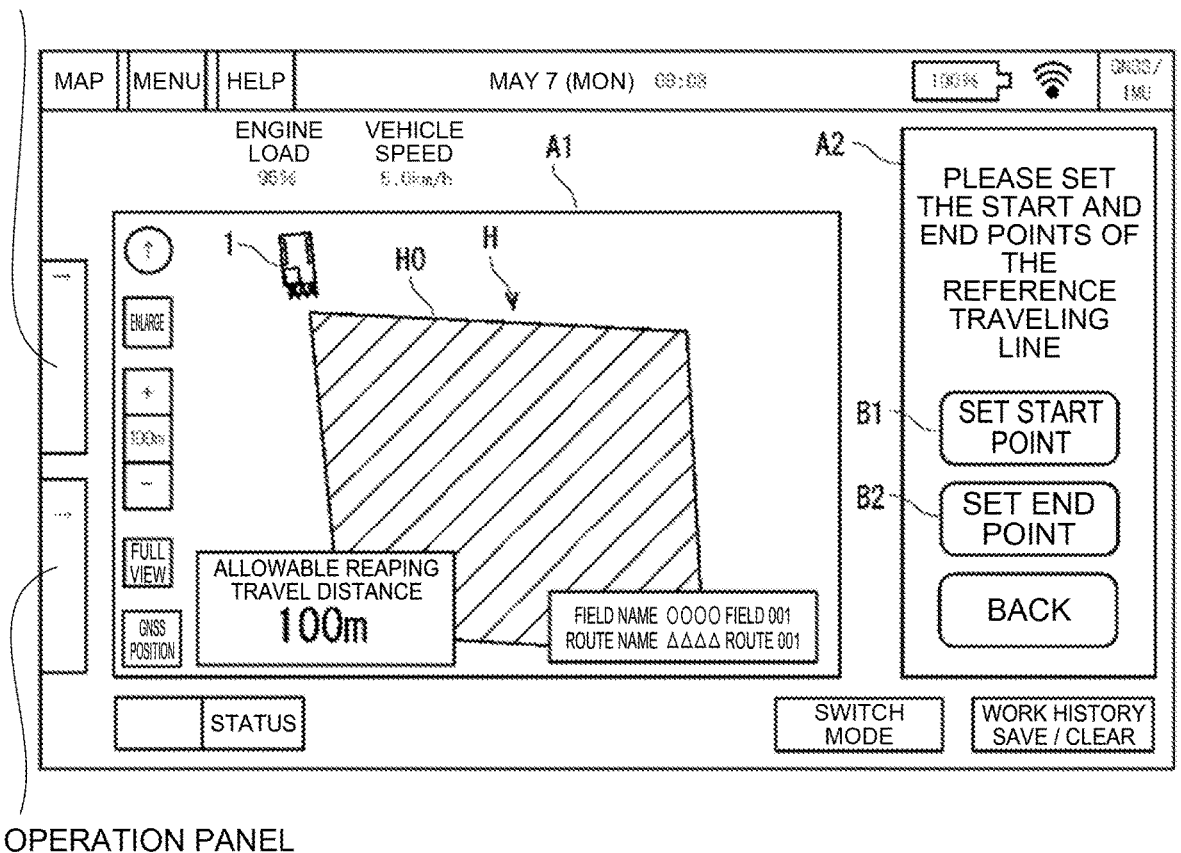
FIG. 6 is a diagram showing a setting screen of a reference traveling line according to an embodiment of the present invention.
Figure 7A:
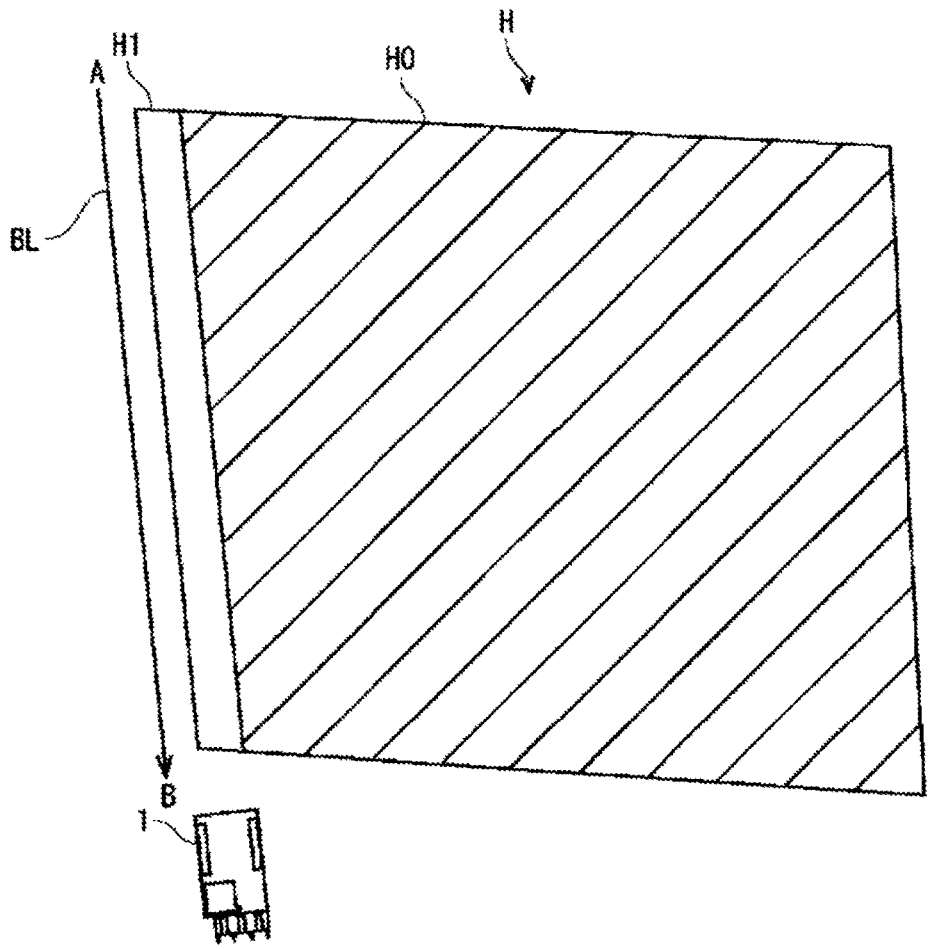
FIG. 7A is a graphic displayed in a first region after setting a reference traveling line.

Next, the control of the combine 1 will be described in detail. FIG. 5 is a control flow diagram of the combine 1. FIG. 6 is a diagram showing a setting screen of the reference traveling line BL. FIG. 7A is a figure displayed in a first region A1 after setting the reference traveling line BL.

The combine 1 (see FIG. 3) includes: an operation unit 63 that receives an operation; a display unit 64 that displays an image; a reference traveling line acquisition unit 71 that acquires a reference traveling line BL indicating a direction of travel by automatic steering; a location information acquisition unit 72 that acquires location information indicating a location of a host vehicle; a field information acquisition unit 74 that acquires field information indicating a location of an outer edge of unworked land in a field; a display control unit 75 that displays, on the display unit 64, the outer edge of the unworked land indicated by the field information, and a setting traveling line SL which is parallel to the reference traveling line BL and in which the location of the host vehicle indicated by the latest location information is set as a reference point; and a control device 45 (an example of a traveling control unit) that causes a host vehicle to travel by automatic steering along the setting traveling line SL at a time point at which the operation unit 63 receives an operation that switches from manual steering to automatic steering.

The operation unit 63, the display unit 64, the reference traveling line acquisition unit 71, the location information acquisition unit 72, the field information acquisition unit 74, and the display control unit 75 are functions realized as a result of the arithmetic unit 60 of the terminal 30 executing arithmetic processing using the programs and data stored in the storage unit 61. The traveling control unit is a function realized as a result of the arithmetic unit 50 of the control device 45 executing arithmetic processing using the programs and data stored in the storage unit 51.

Reference Traveling Line Acquisition Unit

The reference traveling line BL is represented by a straight line connecting a start point A and an end point B (see FIG. 7A). When an operator performs an operation with respect to the terminal 30 that sets the start point A and the end point B (see FIG. 6) while causing the combine 1 to travel by manual steering and performing reaping on unreaped land H0 (an example of unworked land), the terminal 30 sets the reference traveling line BL by acquiring the location information of the start point A and the end point B. Alternatively, the reference traveling line BL may be set by an operator inputting the coordinates of the start point A and the end point B into the terminal 30.

Location Information Acquisition Unit, Orientation Information Acquisition Unit, and Field Information Acquisition Unit The terminal 30 repeatedly acquires the location information of the combine 1 from the positioning unit 34 via the control device 45 of the combine 1 at predetermined time intervals, and stores the information in the storage unit 51 (an example of the location information acquisition unit 72). Furthermore, the terminal 30 repeatedly acquires the orientation information of the combine 1 from the orientation measurement unit 33 at predetermined time intervals, and stores the information in the storage unit 51 (an example of the orientation information acquisition unit 73). Moreover, the terminal 30 acquires field information including the location of the outer edge of the field H, the location of the outer edge of the unreaped land H0 and the reaped land H1 in the field H, and stores the information in the storage unit 51 (an example of the field information acquisition unit 74).

Specifically, a single lap of reaping around the field H is performed by manual operation, and then the outer edge of the field H is represented by the location information acquired using the positioning unit 34 during the single lap. Alternatively, the outer edge of the field H may be acquired as a result of an operator designating the outer edge of the field H on a map displayed on the terminal 30. The location information of the combine 1 while traveling is updated at predetermined time intervals, and is stored in the storage unit 51 each time it is updated. The terminal 30 calculates the outer edge of the reaped land H1 from the path in which the combine 1 has traveled in the field H (location information history of the combine 1) and the reaping width of the reaping unit 3, and calculates the outer edge of the unreaped land H0 from the outer edge of the field H and the outer edge of the reaped land H1.

Display Control Unit

The display control unit 75 displays the outer edge of the unreaped land H0 indicated by the field information on the display unit 64 of the terminal 30. Furthermore, the display control unit 75 displays on the display unit 64 a setting traveling line SL, which is parallel to the reference traveling line BL and has the location of the host vehicle indicated by the latest location information set as a reference point. At this time, the display control unit 75 displays an icon that imitates the appearance of the combine 1 from above at a reference point of the setting traveling line SL. Moreover, the display control unit 75 changes the posture of the icon according to the orientation indicated by the acquired orientation information.

Traveling Control Unit

In automatic reaping work, the control device 45 uses the location information and the orientation information to travel while performing automatic steering of the traveling unit 2 along the setting traveling line SL described later. Furthermore, the control device 45 controls the reaping unit 3, the threshing unit 4, the sorting unit 5, the storage unit 6, and the waste straw processing unit 7 to execute processing such as reaping of grain culms, threshing of the reaped grain culms, sorting of the grains and straw waste, storage of the grains, and processing of the waste straw.

Next, the operation of the combine 1 will be described. The combine 1 is moved to the reaping start location of the unreaped land H0 by manual steering. At the reaping start location, when an operator selects reference traveling line acquisition on a menu screen (not illustrated) displayed on the terminal 30, the terminal 30 starts the processing shown in the flow diagram in FIG. 5. In FIG. 5, steps S01 and S02 represent an example of the information acquisition step. Steps S02 to S05 represent an example of the display control step. Steps S06 to S10 represent an example of the traveling control step.

First, the terminal 30 acquires the field information and the reference traveling line BL (step S01). The acquisition of the field information is as described above. The terminal 30 displays a setting screen of the reference traveling line BL on the display unit 64 (see FIG. 6). In the setting screen, the terminal 30 displays a graphic representing the outer edge of the unreaped land H0, an icon of the combine 1, a button B1 for setting the start point A of the reference traveling line BL, and a button B2 for setting the end point B. Furthermore, the terminal 30 updates the location and posture of the icon in response to changes in the location information and orientation information due to movement of the combine 1. Moreover, the terminal 30 calculates the outer edge of the reaped land H1 from the location information and the reaping width of the reaping unit 3, and updates the boundary line between the reaped land H1 and the unreaped land H0. An operator advances the combine 1 by manual steering along the outer edge of the unreaped land H0 while performing reaping, and operates the buttons B1 and B2 to set the start point A and the end point B. The start point A and the end point B may be the first and last points of a straight line, or may be two points located along the way.

Figure 7B:
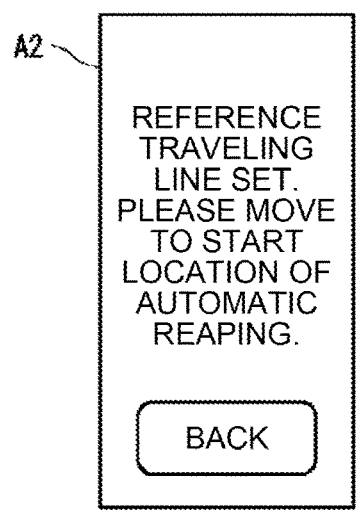
FIG. 7B is a diagram showing a second region after setting a reference traveling line.

When the start point A and the end point B are set, the terminal 30 updates the setting screen (see FIG. 7A). Specifically, the terminal 30 displays the reference traveling line BL by a line segment connecting the start point A and the start point B. FIG. 7B is a diagram showing a second region A2 after setting the reference traveling line BL. The terminal 30 displays a message indicating that the reference traveling line BL has been set, and a message prompting movement to the start location of automatic reaping. Note that the acquisition of the reference traveling line BL may be performed in parallel with the lap of reaping mentioned above that is performed to acquire the field information.

Figure 8A:
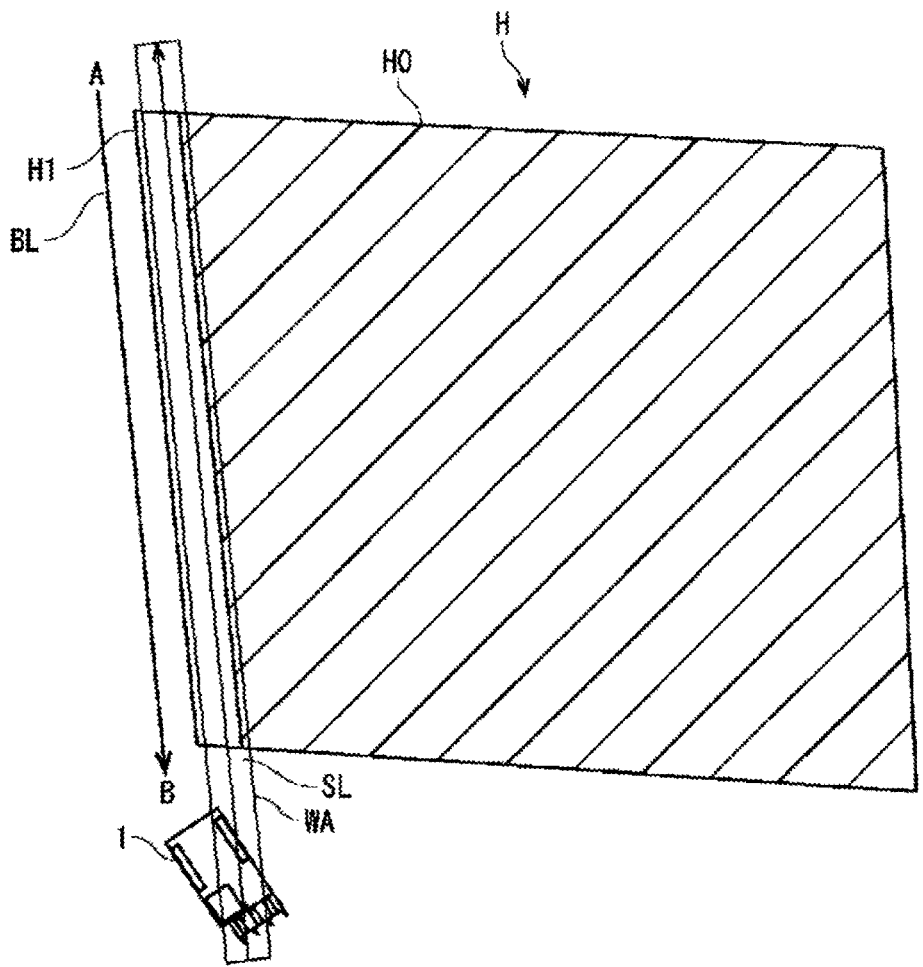
FIG. 8A is a graphic displayed in a first region during movement to a start location.
Figure 8B:
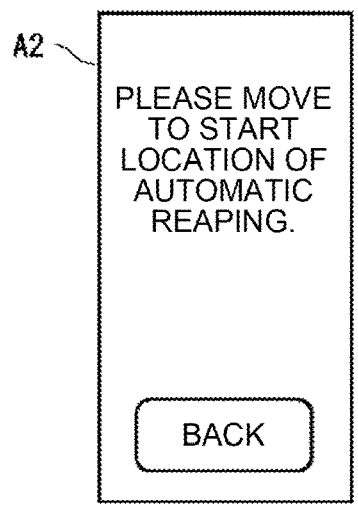
FIG. 8B is a diagram showing a second region during movement to a start location.

Next, the terminal 30 executes, in parallel with the movement by manual steering, acquisition of the location information, acquisition of the orientation information, display of a setting traveling line SL, and display of the outer edge of a work area WA (step S02). Specifically, when an operator starts the movement by manual steering, the terminal 30 displays the setting screen for the automatic reaping start location. FIG. 8A is a graphic displayed in the first region A1 during movement to the start location. FIG. 8B is a diagram showing the second region A2 during movement to the start location. In the setting screen, the terminal 30 displays graphics representing the outer edge of the unreaped land H0 and the reaped land H1, an icon of the combine 1, the reference traveling line BL, the setting traveling line SL, and the outer edge of the work area WA. The setting traveling line SL is a line segment that is parallel to the reference traveling line BL, and has the location of the combine 1 indicated by the latest location information as a reference point. Here, the reference point of the line segment is, for example, the mobile GPS antenna 36 of the combine 1, but the reference point of the setting traveling line SL may also be another point inside the combine 1. The outer edge of the work area WA is represented by line segments that are parallel to the reference traveling line BL and pass through the left and right end portions of the reaping unit 3. Note that the work area WA is displayed by at least the other edge, but the entire work area may also be displayed with a colored, band-shaped graphic.

Figure 9:
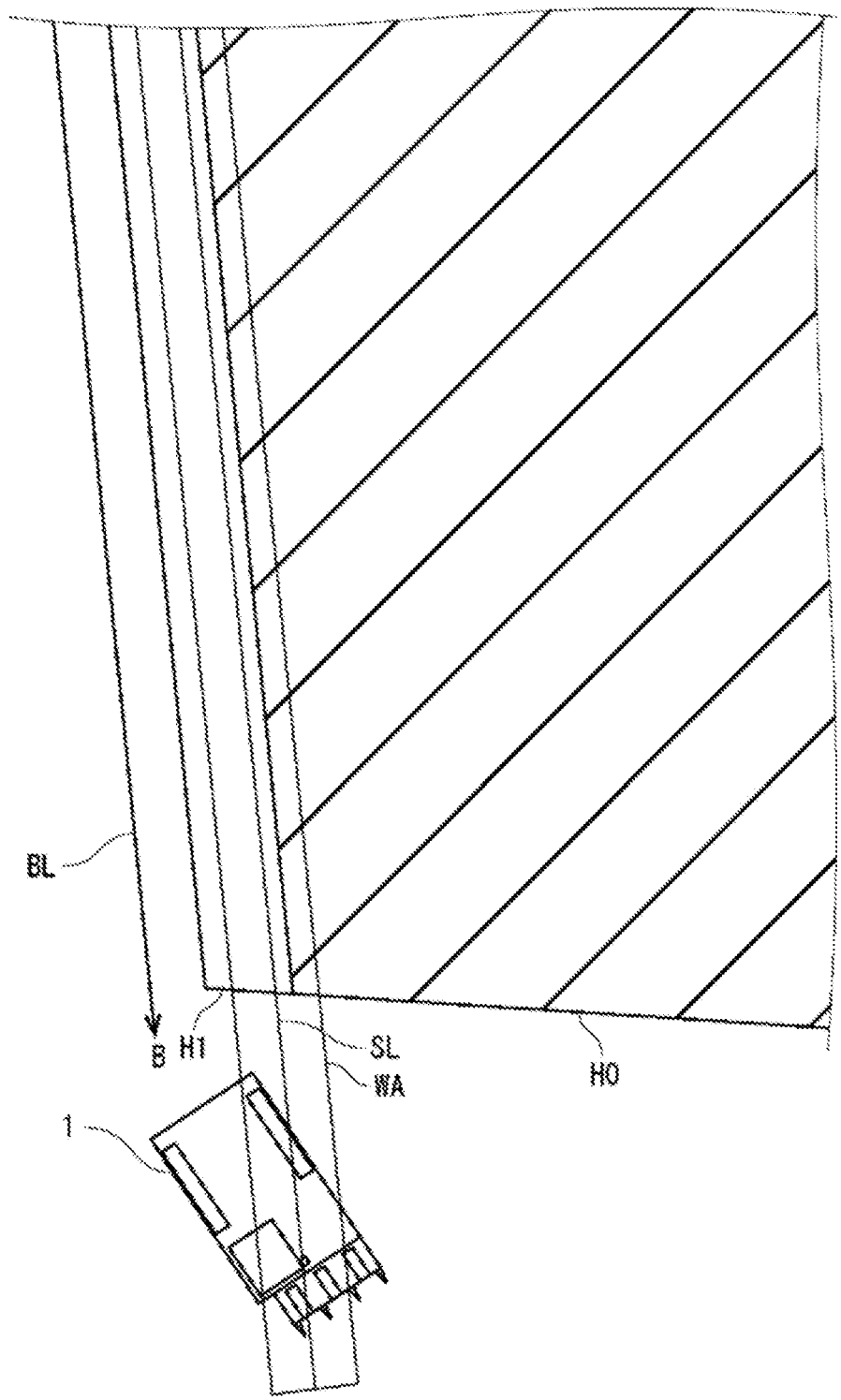
FIG. 9A is an enlarged view of a graphic displayed in a first region during movement to a start location.
Figure 10:
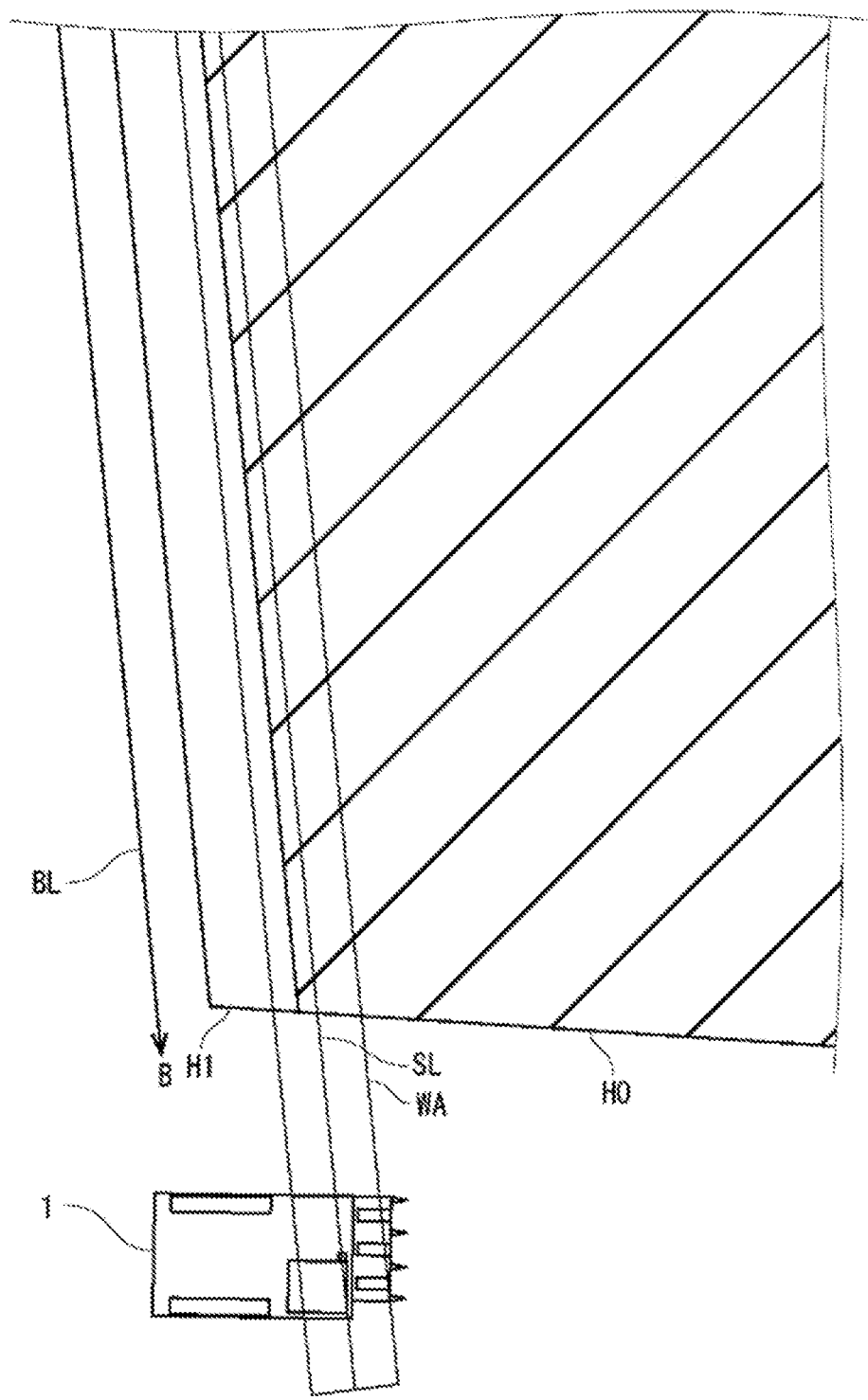
FIG. 10 is an enlarged view of a graphic displayed in a first region during movement to a start location.
Figure 11:
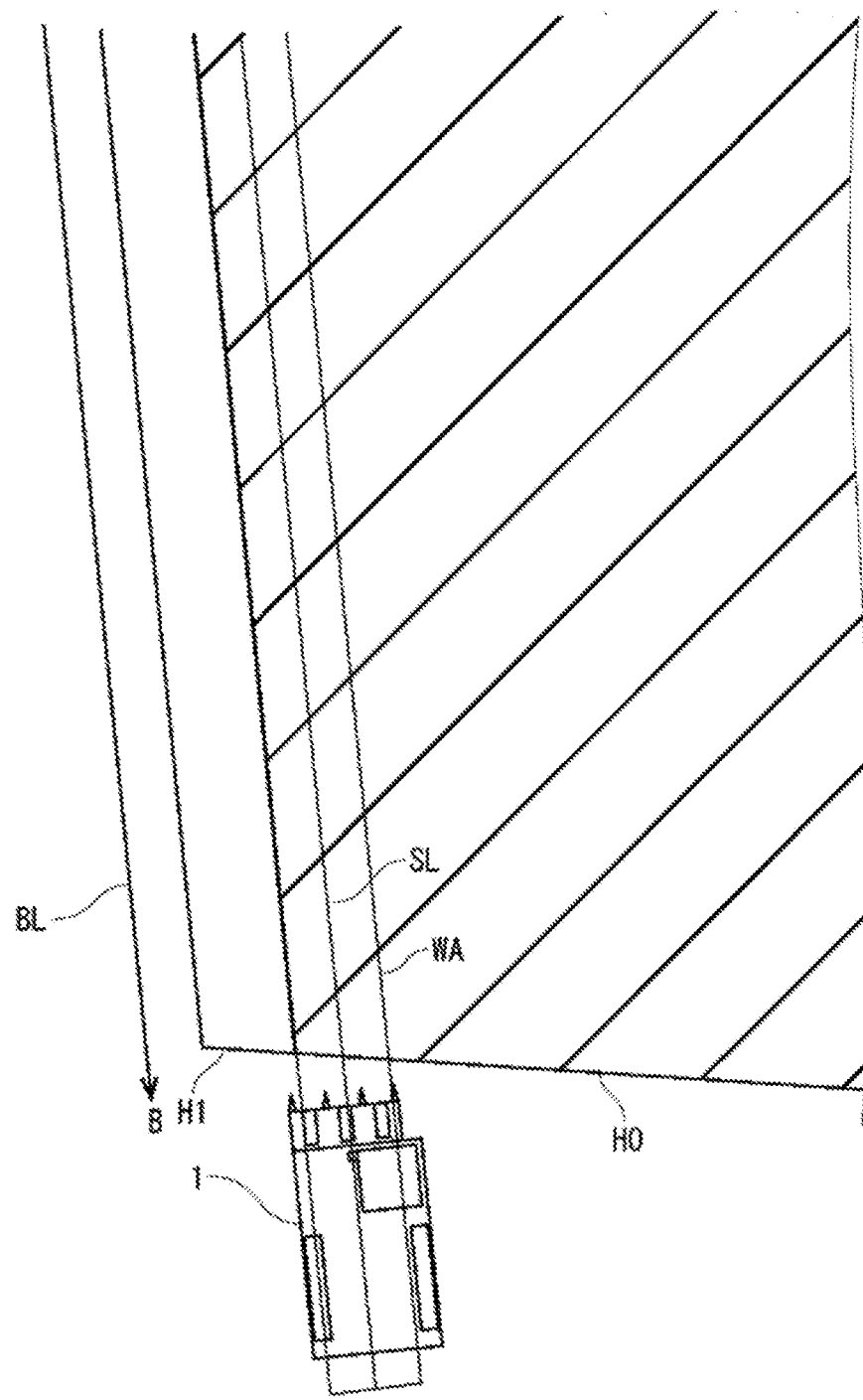
FIG. 11 is an enlarged view of a graphic displayed in a first region after movement to a start location.

The terminal 30 updates the location and posture of the icon, and the location of the setting traveling line SL in response to changes in the location information and the orientation information due to movement of the combine 1. FIGS. 9 and 10 are enlarged views of a graphic displayed in the first region A1 during movement to the start location. FIG. 11 is an enlarged view of a graphic displayed in the first region A1 after movement to the start location. FIGS. 9 to 11 show how the display of the icon and the setting traveling line SL change as the combine 1 moves. As illustrated, the setting traveling line SL moves in parallel (translational movement) with the change in the location of the icon. On the other hand, even if the posture of the icon changes, the posture of the setting traveling line SL does not change and maintains a posture parallel to the reference traveling line BL. An operator performs manual steering of the combine 1 so that an end portion of the work area WA (the left end portion in the present example) coincides with the outer edge of the unreaped land H0. Furthermore, an operator performs manual steering of the combine 1 so that the orientation of the icon coincides with the setting traveling line SL.

Next, the terminal 30 determines whether or not the vehicle speed of the combine 1 is less than or equal to a threshold (step S03). If it is determined that the vehicle speed is greater than the threshold (step S03: NO), the terminal 30 repeats the processing from step S02 onwards. On the other hand, if it is determined that the vehicle speed is equal to or less than the threshold (step S03: YES), the terminal 30 determines whether or not an automatic steering start condition is satisfied (step S04). Note that step S03 may be omitted.

The automatic steering start condition is firstly that deviation of the orientation of the combine 1 with respect to the setting traveling line SL is less than or equal to an allowable value, and secondly that the state of each unit of the combine 1 (the traveling unit 2, the reaping unit 3, the threshing unit 4, the sorting unit 5, the storage unit 6, the waste straw processing unit 7, and the motive power unit 8) is normal. The state of each unit of the combine 1 can be determined by a detection result of a sensor (not illustrated) or the like provided in each unit.

If it is determined that the automatic steering start condition has not been met (step S04: NO), the terminal 30 repeats the processing from step S02 onwards. On the other hand, if it is determined that the automatic steering start condition has been met (step S04: YES), the terminal 30 changes the display of the setting screen (step S05). Specifically, the terminal 30 displays the setting traveling line SL and the work area WA with a different color to that displayed before the automatic steering start condition is satisfied. For example, the setting traveling line SL and the work area WA may be displayed in blue before the automatic steering start condition is satisfied, and displayed in red after the automatic steering start condition is satisfied. Alternatively, the brightness of the display may be different before and after the automatic steering start condition is satisfied. Alternatively, the setting traveling line SL and the work area WA may be displayed blinking after the automatic steering start condition is satisfied.

Figure 12A:
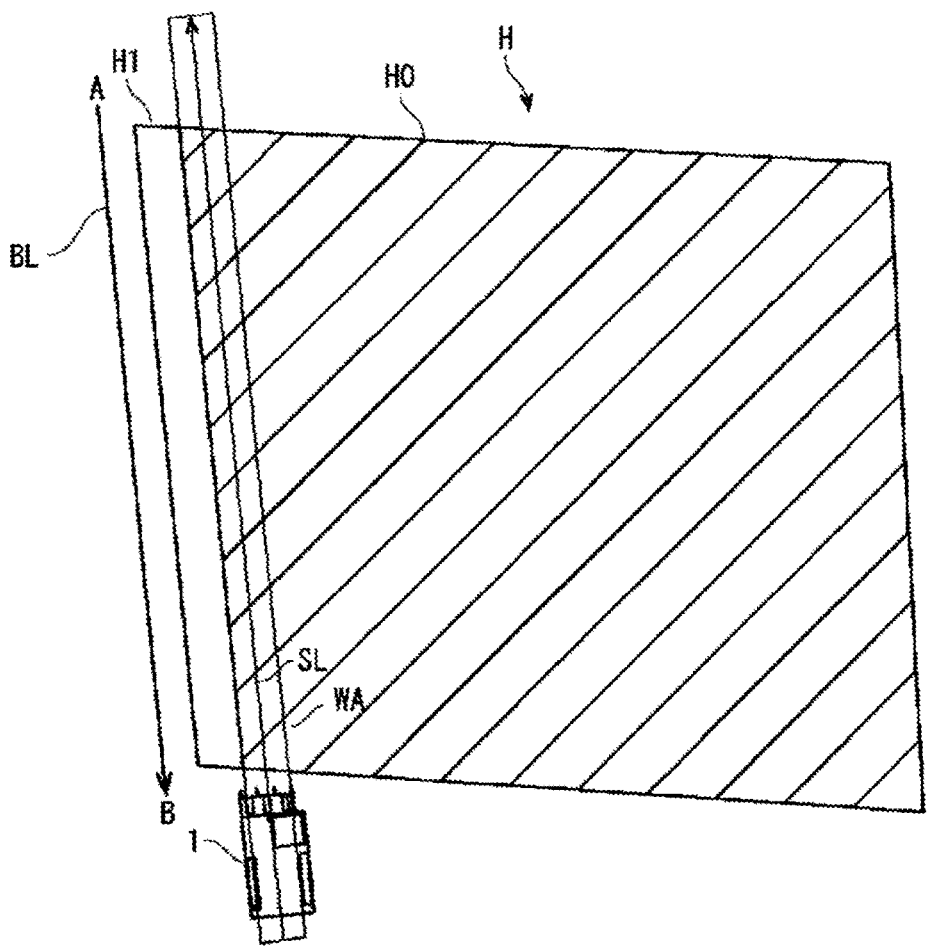
FIG. 12A is a graphic displayed in a first region when an automatic reaping start condition is satisfied.
Figure 12B:
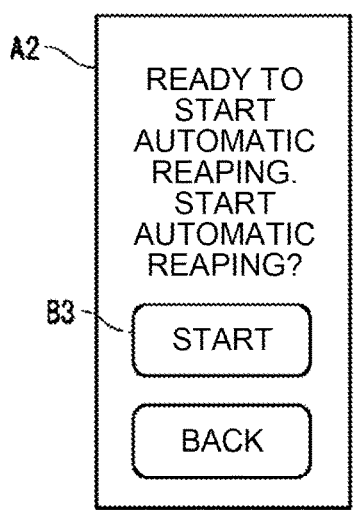
FIG. 12B is a diagram showing the second region when the automatic reaping start condition is satisfied.

Next, the terminal 30 determines whether or not an operation to start working by automatic steering has been performed (step S06). FIG. 12A is a graphic displayed in the first region A1 when the automatic reaping start condition is satisfied. FIG. 12B is a diagram showing the second region A2 when the automatic reaping start condition is satisfied. Specifically, the terminal 30 displays a message indicating that preparation for automatic reaping is complete, a message asking whether or not to start automatic reaping, and a button B3 for starting automatic reaping. If the button B3 has not been operated, the terminal 30 determines that an operation to start working by automatic steering has not been performed (step S06: NO), and repeats the processing from step S02 onwards. On the other hand, if the button B3 has been operated, terminal 30 determines that an operation to start working by automatic steering has been performed (step S06: YES), and starts working by automatic steering, that is, starts automatic reaping work (step S07).

Next, the terminal 30 determines whether or not an operation to stop working by automatic steering has been performed (step S08). Specifically, the terminal 30 displays a stop button (not illustrated) on the display unit 64. If the stop button has not been operated (step S08: NO), the terminal 30 repeats the processing of step S08. On the other hand, if the stop button has been operated (step S08: YES), the terminal 30 stops working by automatic steering, switches to manual steering (step S09), and determines whether or not an operation to end the operation has been performed (step S10). If it is determined that an operation to end the operation has not been performed (step S10: NO), the terminal 30 repeats the processing from step S02 onwards. On the other hand, if it is determined that an operation to end the operation has been performed (step S10: YES), the terminal 30 ends the control of the combine 1.

According to the combine 1 of the present embodiment described above, the display control unit 75 is provided that displays, on the display unit 64, the outer edge of the unworked land indicated by the field information, and the setting traveling line SL, which is parallel to the reference traveling line BL, and has the location of the host vehicle indicated by the latest location information as a reference point. According to this configuration, the setting traveling line SL displayed while traveling by manual steering follows the movement of the host vehicle. For example, by moving the combine 1 so that the setting traveling line SL is shifted to the right side from the outer edge of the unreaped land H0 by approximately one-half of the width of the reaped land H1, the left end portion of the reaping unit 3 can be aligned with the outer edge of the unreaped land H0. Therefore, according to the combine 1 of the present embodiment, a setting traveling line SL that is parallel to a reference traveling line BL can be easily set.

Moreover, according to the combine 1 of the present embodiment, the display control unit 75 displays the setting traveling line SL and the work area WA differently depending on whether the condition required to start automatic steering is met or the condition is not met. According to the present configuration, it is possible to visually determine whether or not automatic steering can be started.

In addition, according to the combine 1 of the present embodiment, the display control unit 75 displays the outer edge of the work area WA of the host vehicle based on the setting traveling line SL. According to this configuration, the start location of automatic steering can be set while confirming the positional relationship between the work area WA and the unworked land.

The embodiment described above may be modified as follows.

First Modification

Figure 13:
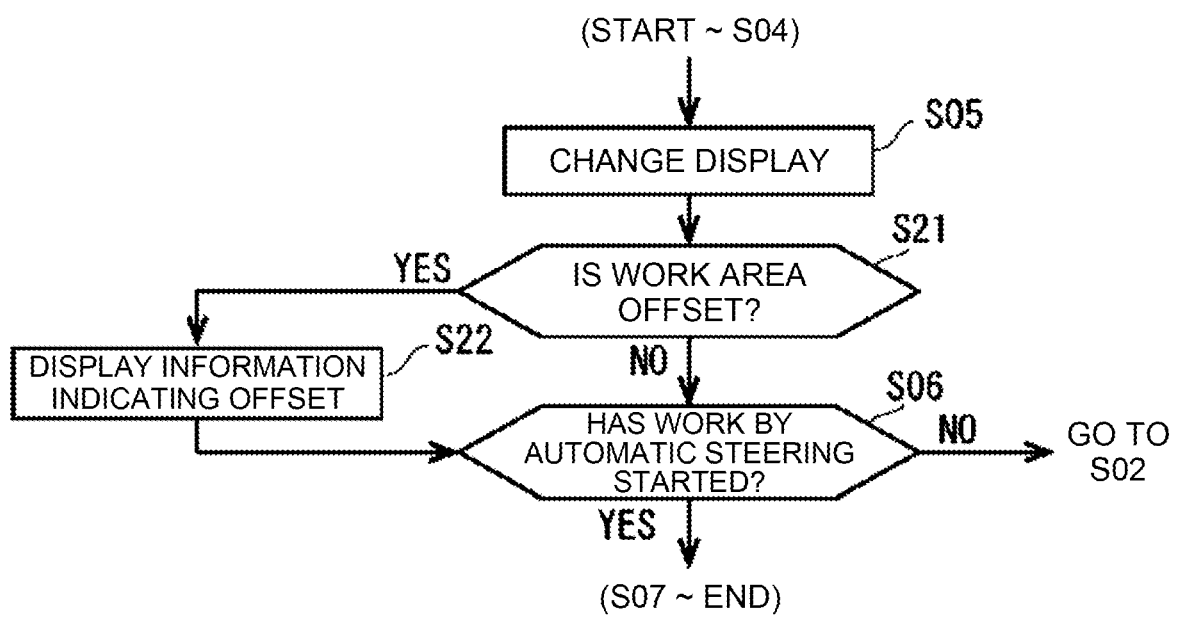
FIG. 13 is a flow control diagram of processing according to a first modification of an embodiment of the present invention.
Figure 14A:
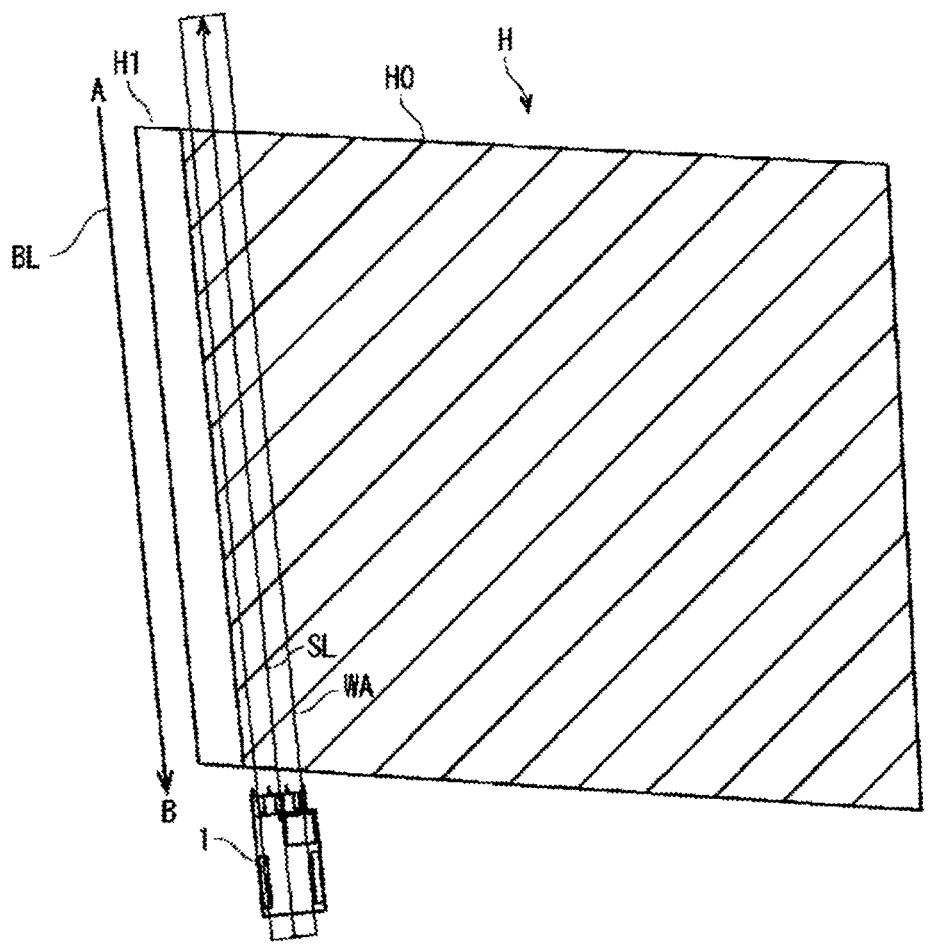
FIG. 14A is a graphic displayed in a first region of a setting screen according to a first modification of an embodiment of the present invention.
Figure 14B:
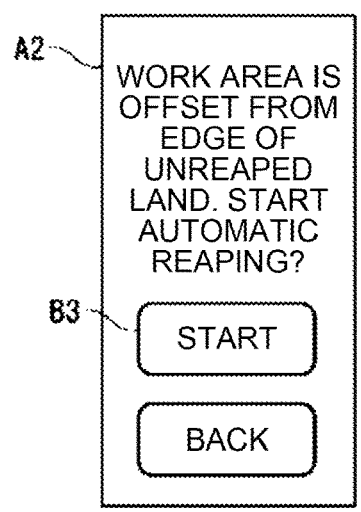
FIG. 14B is a diagram showing a second region of the setting screen according to the first modification of an embodiment of the present invention.

The following processing may be added to the embodiment described above. In a first modification, the following processing is executed after step S05 of the embodiment described above. FIG. 13 is a processing flow diagram according to the first modification. Steps S21 and S22 represent an example of the display control step. FIG. 14A is a graphic displayed in the first region A1 of a setting screen according to the first modification. FIG. 14B is a diagram showing the second region A2 of a setting screen according to the first modification. Following step S05, the terminal 30 determines whether or not the outer edge of the work area WA is offset with respect to the outer edge of the unreaped land H0 indicated by the field information (step S21). In the example of FIG. 14A, an example is shown in which the left outer edge of the work area WA is offset to the right. The terminal 30 calculates the distance between the left or right outer edge of the work area WA that is the closer outer edge to the outer edge of the unreaped land H0 (in this example, the left outer edge) and the outer edge of the unreaped land H0, and determines that the outer edge of the work area WA is offset when the calculated distance is greater than or equal to a threshold.

If it is determined that the outer edge of the work area WA is offset (step S21: YES), the terminal 30 displays information indicating an offset in the work area WA (Step S22), and moves to the processing of step S06. In this example, a message indicating that the work area WA is offset is displayed as the information indicating an offset in the work area WA. If it is determined that the outer edge of the work area WA is not offset (step S21: NO), the terminal 30 moves to the processing of step S06. The processing of step S06 onwards is the same as in the embodiment described above.

According to the present modification, after the condition required to start automatic steering is satisfied, because information indicating an offset in the work area WA is displayed when the outer edge of the work area WA is offset with respect to the outer edge of the unworked land indicated by the field information, an offset in the work area WA can be more easily recognized.

Furthermore, according to the present modification, after the display control unit 75 displays the information indicating an offset in the work area WA, because the host vehicle travels by automatic steering along the setting traveling line SL when an operation allowing traveling by automatic steering is received by the operation unit 63, traveling by automatic steering can be started when an operator determines that the offset in the work area WA is acceptable.

Second Modification

Figure 15:
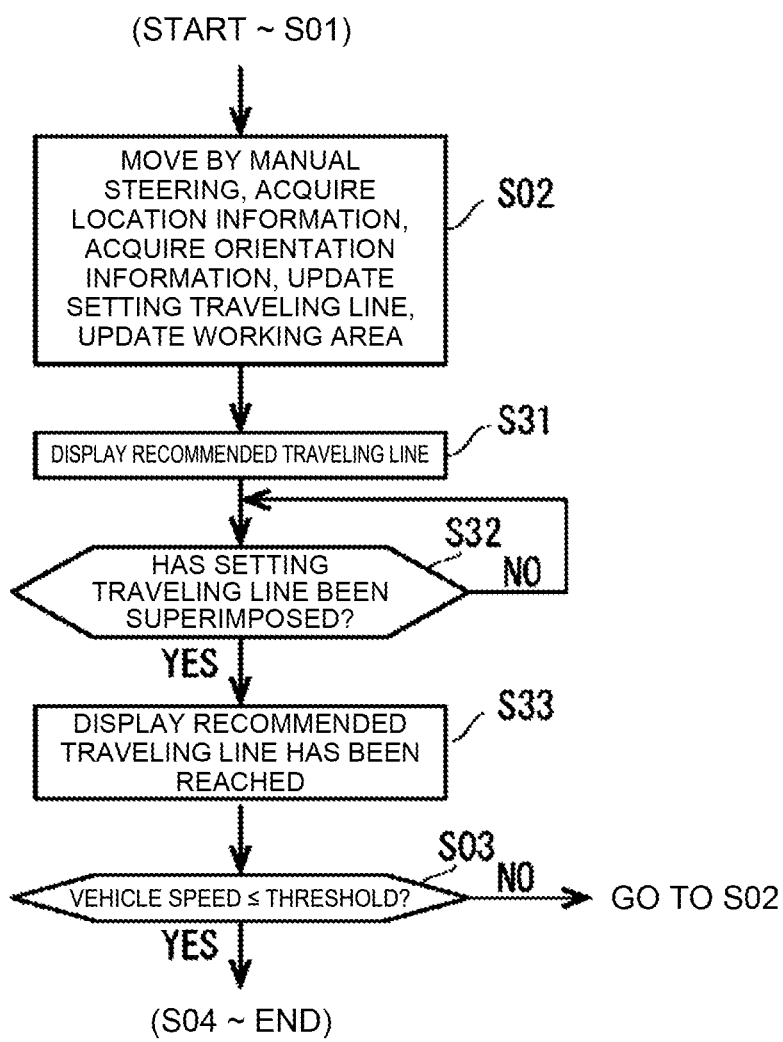
FIG. 15 is a flow control diagram of processing according to a second modification of an embodiment of the present invention.
Figure 16A:
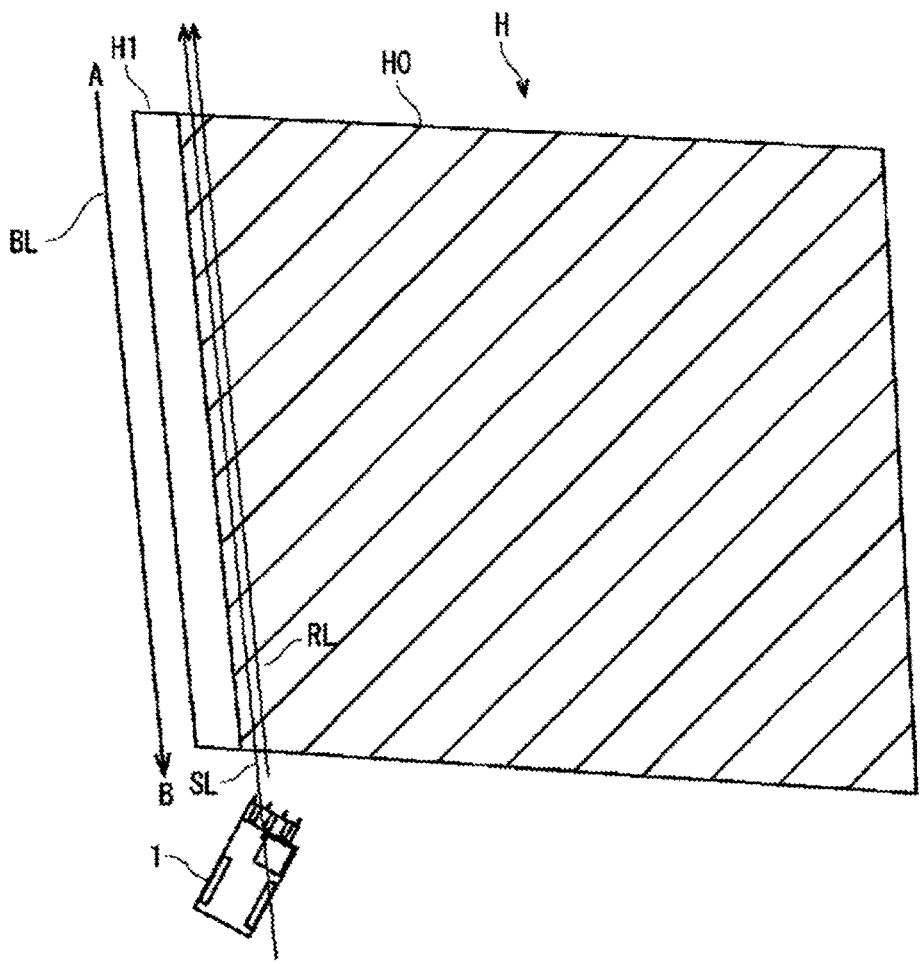
FIG. 16A is a graphic displayed in a first region of a setting screen according to a second modification of an embodiment of the present invention.
Figure 16B:
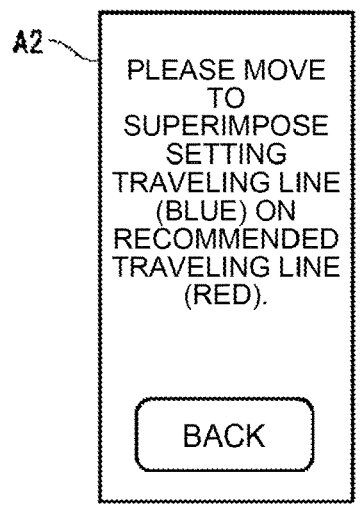
FIG. 16B is a diagram showing a second region of a setting screen according to the second modification of an embodiment of the present invention.
Figure 17A:
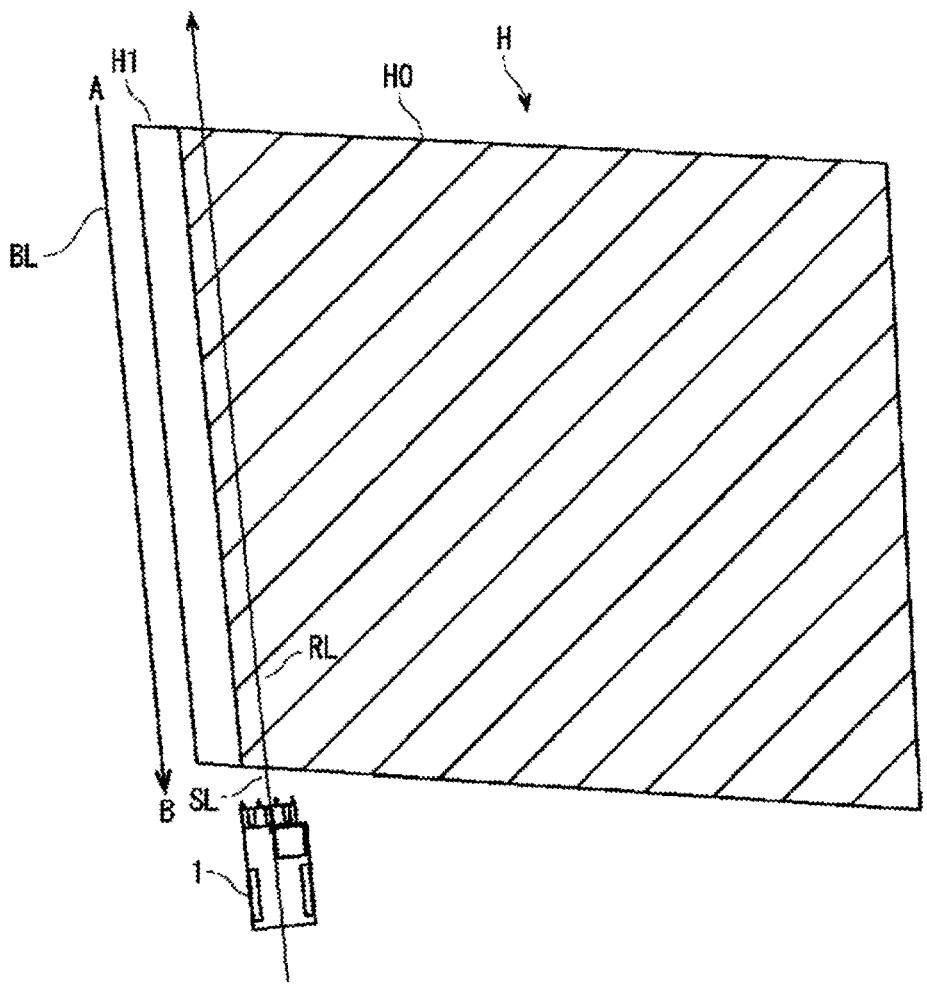
FIG. 17A is a graphic displayed in a first region of a setting screen according to the second modification of an embodiment of the present invention.
Figure 17B:
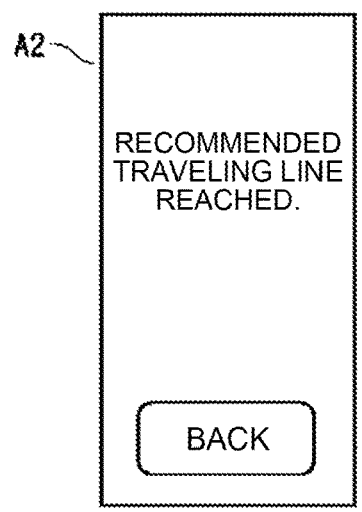
FIG. 17B is a diagram showing a second region of a setting screen according to the second modification of an embodiment of the present invention.

The following processing may be added to the embodiment described above. In a second modification, the following processing is executed after step S02 of the embodiment described above. FIG. 15 is a processing flow diagram according to the second modification. Steps S31 to S33 represent an example of the display control step. FIGS. 16A and 17A are graphics displayed in the first region A1 of a setting screen according to the second modification. FIGS. 16B and 17B are diagrams showing the second region A2 of a setting screen according to the second modification. Following step S02, the terminal 30 displays a recommended traveling line RL (step S31). The recommended traveling line RL, for example, corresponds to the setting traveling line SL when the outer edge of the unreaped land H0 and the outer edge of the work area WA (in this example, the left outer edge) are superimposed.

Next, the terminal 30 determines whether or not the setting traveling line SL is superimposed on the recommended traveling line RL (step S32). In the example of FIG. 16A, the setting traveling line SL is not superimposed on the recommended traveling line RL. In this case, the terminal 30 determines that the setting traveling line SL is not superimposed on the recommended traveling line RL (step S32: NO), and repeats the processing of step S32. On the other hand, in the example of FIG. 17A, the setting traveling line SL is superimposed on the recommended traveling line RL. In this case, the terminal 30 determines that the setting traveling line SL is superimposed on the recommended traveling line RL (step S32: YES), and a message is displayed indicating that the host vehicle has reached the recommended traveling line RL. The processing of step S03 onwards is the same as in the embodiment described above.

According to the present modification, when the recommended traveling line RL obtained from the outer edge of the unworked land and the work area WA of the host vehicle is displayed, and the setting traveling line SL is superimposed on the recommended traveling line RL, because it is displayed that the host vehicle has reached the recommended traveling line RL, the start location of automatic steering can be easily set by bringing the setting traveling line SL close to the recommended traveling line RL.

Third Modification

Figure 18:
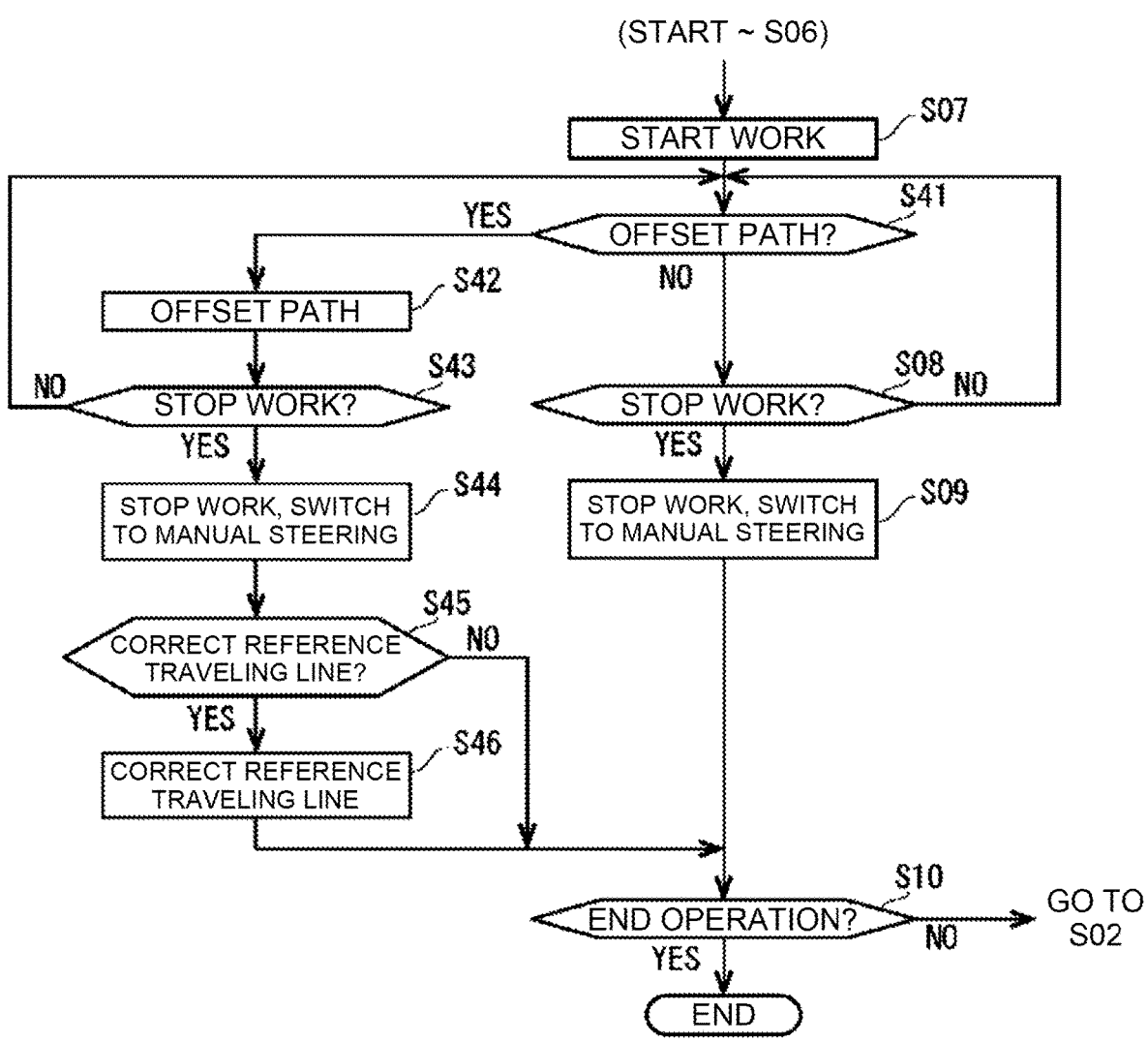
FIG. 18 is a flow control diagram of processing according to a third modification of an embodiment of the present invention.
Figure 19A:
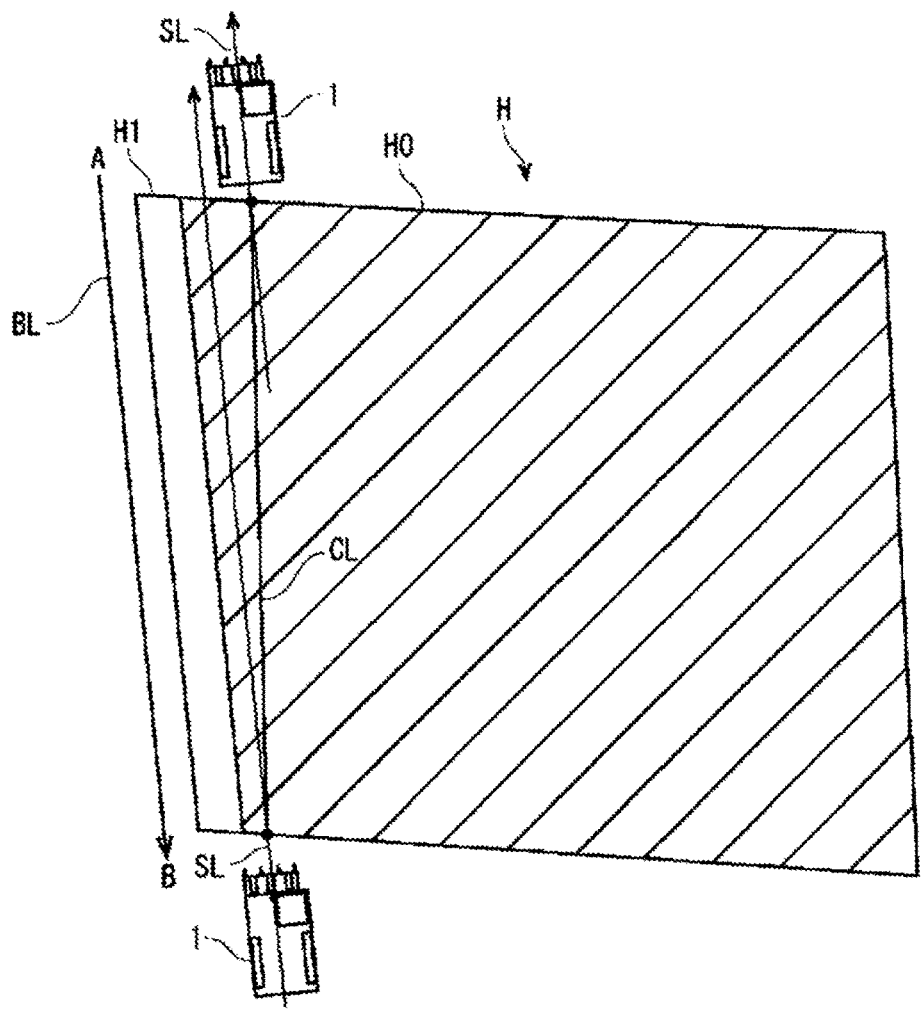
FIG. 19A is a graphic displayed in a first region of a setting screen according to a third modification of an embodiment of the present invention.
Figure 19B:
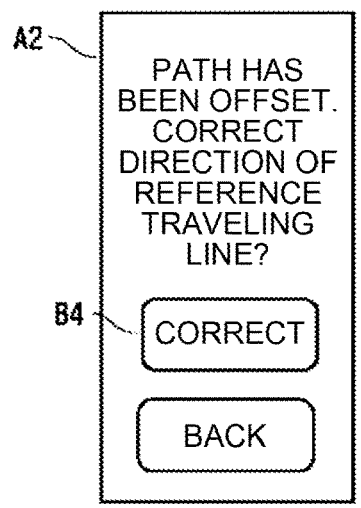
FIG. 19B is a diagram showing a second region of a setting screen according to the third modification of an embodiment of the present invention.

The following processing may be added to the embodiment described above. In a third modification, the following processing is executed after the step S07 of the embodiment described above. FIG. 18 is a processing flow diagram according to the third modification. Steps S41 to S46 represent an example of the correction step. FIG. 19A is a graphic displayed in the first region A1 of a setting screen according to the third modification. FIG. 19B is a diagram showing the second region A2 of a setting screen according to the third modification. Following step S07, the terminal 30 determines whether or not a path offsetting instruction has been received by a reception unit (step S41). Bus offsetting is processing that translates the setting traveling line SL by a predetermined distance while traveling by automatic steering (see FIG. 19A). If the bus offsetting instruction has not been received (step S41: NO), the terminal 30 moves to the processing of step S08. On the other hand, if the bus offsetting instruction has been received (step S41: YES), the terminal 30 transmits an instruction to the control device 45 to travel after moving the setting traveling line SL in parallel by a predetermined distance (step S42).

Next, the terminal 30 determines whether or not an operation to stop working by automatic steering has been performed (step S43). Specifically, the terminal 30 displays a stop button (not illustrated) on the display unit 64. If the stop button has not been operated (step S43: NO), the terminal 30 repeats the processing from step S41 onwards. On the other hand, if the stop button has been operated (step S43: YES), the terminal 30 stops the work, switches to manual steering (step S44), and determines whether or not an operation correcting the reference traveling line BL has been performed (step $45). Specifically, a message asking whether or not to correct the reference traveling line BL and a button B4 for correcting the reference traveling line BL are displayed (see FIG. 19B). If the button B4 has not been operated, the terminal 30 determines that an operation correcting the reference traveling line BL has not been performed (step S45: NO), and moves to the processing of step S10. On the other hand, if the button B4 has been operated, the terminal 30 determines that an operation correcting the reference traveling line BL has been performed (step S45: YES), corrects the direction of the reference traveling line BL to become parallel to a straight line CL connecting the start point and the end point of the immediately preceding travel by automatic steering (step S46), and moves to the processing of step S10. Note that the processing of step S45 may be omitted.

According to the present modification, because the correction unit 76 is provided that corrects the direction of the reference traveling line BL to become parallel to the straight line CL connecting the start point and the end point of the travel by automatic steering when the location of the host vehicle is changed during travel by automatic steering to a direction that intersects the setting traveling line SL, the direction of the reference traveling line BL can be easily changed.

In the embodiment described above, although an example has been described in which the work area WA is displayed in addition to the setting traveling line SL, it is possible to display only the setting traveling line SL or to display the work area WA instead of the setting traveling line SL.

In the first modification, although an example has been described in which a message indicating that the work area WA is offset is displayed when the work area WA is offset, the amount of offset in the work area WA may be displayed in addition to this. Such a configuration simplifies the work of correcting the offset in the work area WA.

In the second modification, although an example has been described in which the setting traveling line SL and the recommended traveling line RL are displayed, the amount of offset between the setting traveling line SL and the recommended traveling line RL may be displayed in addition to this. Such a configuration simplifies the work of superimposing the setting traveling line SL with the recommended traveling line RL.

In the embodiment described above, although an example has been described in which the present invention is applied to the combine 1, the present invention may also be applied to working vehicles other than the combine 1, such as rice transplanters and cultivators.

DESCRIPTION OF REFERENCE NUMERALS

1 Combine
45 Control device (travel control unit)
63 Operation unit
64 Display unit
71 Reference traveling line acquisition unit
72 Location information acquisition unit
74 Field information acquisition unit
75 Display control unit
76 Correction unit
BL Reference traveling line
SL Setting traveling line
WA Work area
RL Recommended traveling line
CL Straight line connecting start point and end point of travel by automatic steering

The invention claimed is:

1. A working vehicle comprising:
an operation unit configured to receive an operation;
a display unit configured to display an image;
a reference traveling line acquisition unit configured to acquire a reference traveling line indicating a direction of travel of a working vehicle by automatic steering;
a location information acquisition unit configured to acquire location information indicating a location of a host vehicle;
a field information acquisition unit configured to acquire field information indicating a location of an outer edge of unworked land in a field;
a display control unit configured to display, on the display unit, after acquiring the reference traveling line and during travel of the working vehicle by manual steering, the outer edge of the unworked land indicated by the field information, and a setting traveling line which is parallel to the reference traveling line and in which the location of the host vehicle indicated by the latest location information is set as a reference point, the setting traveling line is displayed such that the setting traveling line moves in accordance with the travel of the working vehicle while remaining parallel to the reference traveling line; and
a traveling control unit configured to control the host vehicle to travel by automatic steering along the setting traveling line at a time point at which the operation unit receives the operation that switches from manual steering to automatic steering.

2. The working vehicle according to claim 1, wherein the display control unit is configured to display the setting traveling line differently depending on whether a condition required to start automatic steering is met or the condition is not met.

3. The working vehicle according to claim 1, wherein the display control unit is configured to display an outer edge of a work area of the host vehicle based on the setting traveling line.

4. The working vehicle according to claim 3, wherein the display control unit, in a case where the outer edge of the work area is offset from the outer edge of the unworked land indicated by the field information after a condition required to start automatic steering is met, is configured to display information indicating the offset in the work area.

5. The working vehicle according to claim 4, wherein the traveling control unit, in a case where the operation unit receives an operation allowing travel by automatic steering after the display control unit displays information indicating the offset in the work area, is configured to control the host vehicle to travel by automatic steering along the setting traveling line.

6. The working vehicle according to claim 1, wherein the display control unit is configured to display a recommended traveling line obtained from the outer edge of the unworked land and a work area of the host vehicle, and, in a case where the setting traveling line is superimposed on the recommended traveling line, is configured to display that the host vehicle has reached the recommended traveling line.

7. The working vehicle according to claim 1, further comprising:
a correction unit that, in a case where the location of the host vehicle is changed during travel by automatic steering in a direction that intersects the setting traveling line, is configured to correct a direction of the reference traveling line to become parallel to a straight line connecting a start point and an end point of travel by automatic steering.

8. A working vehicle control method comprising:
acquiring a reference traveling line indicating a direction of travel of a working vehicle by automatic steering, location information indicating a location of a host vehicle, and field information indicating a location of an outer edge of unworked land in a field;
displaying, on a display unit, after acquiring the reference traveling line and during travel of the working vehicle by manual steering, the outer edge of the unworked land indicated by the field information, and a setting traveling line which is parallel to the reference traveling line and in which the location of the host vehicle indicated by the latest location information is set as a reference point, the setting traveling line is displayed such that the setting traveling line moves in accordance with the travel of the working vehicle while remaining parallel to the reference traveling line; and
controlling the host vehicle to travel by automatic steering along the setting traveling line at a time point at which an operation unit receives an operation that switches from manual steering to automatic steering.

9. The working vehicle control method according to claim 8, wherein the setting traveling line is displayed differently depending on whether a condition required to start automatic steering is met or the condition is not met.

10. The working vehicle control method according to claim 8, wherein an outer edge of a work area of the host vehicle is displayed based on the setting traveling line.

11. The working vehicle control method according to claim 10, wherein, in a case where the outer edge of the work area is offset from the outer edge of the unworked land indicated by the field information after a condition required to start automatic steering is met, information is displayed indicating the offset in the work area.

12. The working vehicle control method according to claim 11, wherein, in a case where the operation unit receives an operation allowing travel by automatic steering after information indicating the offset in the work area is displayed, the host vehicle is made to travel by automatic steering along the setting traveling line.

13. The working vehicle control method according to claim 8, wherein a recommended traveling line is displayed which is obtained from the outer edge of the unworked land and a work area of the host vehicle, and, in a case where the setting traveling line is superimposed on the recommended traveling line, a fact that the host vehicle has reached the recommended traveling line is displayed.

14. The working vehicle control method according to claim 8, further comprising:
correcting, in a case where the location of the host vehicle is changed during travel by automatic steering in a direction that intersects the setting traveling line, a direction of the reference traveling line to become parallel to a straight line connecting a start point and an end point of travel by automatic steering.

* * * * *